(12) United States Patent
Kudo

(10) Patent No.: US 12,555,467 B2
(45) Date of Patent: Feb. 17, 2026

(54) INFORMATION PROCESSING DEVICE, INFORMATION PROCESSING METHOD, AND MOBILE DEVICE

(71) Applicant: SONY GROUP CORPORATION, Tokyo (JP)

(72) Inventor: Yusuke Kudo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 188 days.

(21) Appl. No.: 18/257,442

(22) PCT Filed: Dec. 13, 2021

(86) PCT No.: PCT/JP2021/045902
§ 371 (c)(1),
(2) Date: Jun. 14, 2023

(87) PCT Pub. No.: WO2022/138298
PCT Pub. Date: Jun. 30, 2022

(65) Prior Publication Data
US 2024/0021073 A1 Jan. 18, 2024

(30) Foreign Application Priority Data
Dec. 23, 2020 (JP) .................................. 2020-214332

(51) Int. Cl.
*G08G 1/005* (2006.01)
*G01C 21/34* (2006.01)

(52) U.S. Cl.
CPC ......... *G08G 1/005* (2013.01); *G01C 21/3407* (2013.01)

(58) Field of Classification Search
None
See application file for complete search history.

(56) References Cited

U.S. PATENT DOCUMENTS

| | | | |
|---|---|---|---|
| 2008/0147261 A1* | 6/2008 | Ichinose | G01C 22/006 901/1 |
| 2020/0033135 A1* | 1/2020 | Huh | G06V 40/172 |

(Continued)

FOREIGN PATENT DOCUMENTS

| | | | |
|---|---|---|---|
| JP | 2003-340764 A | 12/2003 | |
| JP | 2004-157032 A | 6/2004 | |

(Continued)

OTHER PUBLICATIONS

International Search Report and Written Opinion of PCT Application No. PCT/JP2021/045902, issued on Feb. 8, 2022, 11 pages of ISRWO.

*Primary Examiner* — Khoi H Tran
*Assistant Examiner* — Dairon Estevez
(74) *Attorney, Agent, or Firm* — CHIP LAW GROUP

(57) ABSTRACT

Guidance for a guidance target can be performed efficiently as necessary and sufficiently. An information processing device is included in a mobile device that guides a guidance target to a destination. A setting unit sets any predetermined point among points from a guidance start point to the destination of the guidance target as a guidance end point on the basis of the destination of the guidance target and at least one or more of environment information of a guidance route, an attribute of the guidance target, and unique information of the guidance target. For example, a determination unit determines a point different from the set guidance end point as a guidance end point on the basis of a predetermined condition after guidance is started.

16 Claims, 17 Drawing Sheets

(56) References Cited

U.S. PATENT DOCUMENTS

| | | | |
|---|---|---|---|
| 2020/0164515 A1* | 5/2020 | Han | G05D 1/0274 |
| 2022/0055207 A1* | 2/2022 | Higashi | B25J 13/089 |

FOREIGN PATENT DOCUMENTS

| | | | | |
|---|---|---|---|---|
| JP | 2004252771 A | * | 9/2004 | |
| JP | 2007-178192 A | | 7/2007 | |
| JP | 2007-260822 A | | 10/2007 | |
| JP | 2008-152504 A | | 7/2008 | |
| JP | 2011000656 A | * | 1/2011 | |
| JP | 2012-225712 A | | 11/2012 | |
| JP | 2019021166 A | * | 2/2019 | |
| JP | 2019215840 A | * | 12/2019 | |
| KR | 20200046148 A | * | 5/2020 | B25J 9/1664 |
| WO | 2010/137135 A1 | | 12/2010 | |

* cited by examiner

FIG. 6

SETTING EXAMPLE OF GUIDANCE ROUTE AND GUIDANCE METHOD BY ATTRIBUTE OF TARGET PERSON

| ATTRIBUTE OF TARGET PERSON | RECOGNITION METHOD | GUIDANCE ROUTE | GUIDANCE METHOD |
|---|---|---|---|
| YOUNG PERSON | IMAGE RECOGNITION ACQUISITION OF INFORMATION FROM POSSESSED TERMINAL | SHORTEST DISTANCE | HIGH SPEED |
| ELDERLY PERSON | IMAGE RECOGNITION ACQUISITION OF INFORMATION FROM POSSESSED TERMINAL | AVOIDING STEP | LOW SPEED |
| VISUALLY IMPAIRED PERSON | IMAGE RECOGNITION (WHITE CANE, GUIDE DOG) | ALONG BRAILLE BLOCK | LOW SPEED VOICE GUIDANCE (TEMPORARY STOP OR TURN) AT CORNER |
| FOREIGNER | LANGUAGE AT TIME OF DESTINATION INPUT VOICE RECOGNITION | SHORTEST DISTANCE ROUTE PRIORITY WITH GUIDANCE SIGNBOARD IN NATIVE LANGUAGE | HIGH SPEED |
| CHILD | IMAGE RECOGNITION | WITH MANY PEOPLE | LOW SPEED |
| INTIMATE CUSTOMER GROUP | CONVERSATION AMOUNT IN GROUP | GIVING PRIORITY TO MAIN STREET | MEDIUM SPEED |
| NON-INTIMATE CUSTOMER GROUP | CONVERSATION AMOUNT IN GROUP | GIVING PRIORITY TO MAIN STREET | MEDIUM SPEED |

FIG. 9

CHANGE EXAMPLE OF DESTINATION AND GUIDANCE END DETERMINATION BASED ON ATTRIBUTE OF TARGET PERSON AND KNOWLEDGE LEVEL OF TARGET PERSON REGARDING FACILITY

KNOWLEDGE LEVEL OF TARGET PERSON REGARDING FACILITY: HIGH ← → LOW

| Knowledge | YOUNG PERSON | CHILD | VISUALLY IMPAIRED PERSON | ELDERLY PERSON | FOREIGNER | INTIMATE CUSTOMER GROUP | NON-INTIMATE CUSTOMER GROUP |
|---|---|---|---|---|---|---|---|
| HIGH | • DESTINATION: GUIDANCE SIGNBOARD<br>• GUIDANCE END: UNTIL TARGET PERSON RECOGNIZES GUIDANCE SIGNBOARD | • DESTINATION: PREVIOUS CORNER<br>• GUIDANCE END: UNTIL TARGET PERSON CAN SEE END OF CORNER | • DESTINATION: NO CORRECTION<br>• GUIDANCE END: UNTIL ARRIVAL AT DESTINATION | • DESTINATION: GUIDANCE SIGNBOARD<br>• GUIDANCE END: UNTIL ARRIVAL AT GUIDANCE SIGNBOARD | • DESTINATION: NO CORRECTION OR GUIDANCE SIGNBOARD IN NATIVE LANGUAGE<br>• GUIDANCE END: UNTIL TARGET PERSON RECOGNIZES DESTINATION OR GUIDANCE SIGNBOARD IN NATIVE LANGUAGE | • DESTINATION: GUIDANCE SIGNBOARD<br>• GUIDANCE END: UNTIL AT LEAST ONE TARGET PERSON RECOGNIZES GUIDANCE SIGNBOARD | • DESTINATION: GUIDANCE SIGNBOARD<br>• GUIDANCE END: UNTIL HALF OF TARGET PERSONS RECOGNIZE GUIDANCE SIGNBOARD |
| MID | • DESTINATION: PREVIOUS CORNER<br>• GUIDANCE END: UNTIL TARGET PERSON CAN SEE CORNER | | • DESTINATION: NO CORRECTION<br>• GUIDANCE END: UNTIL ARRIVAL AT DESTINATION | • DESTINATION: PREVIOUS CORNER<br>• GUIDANCE END: UNTIL ARRIVAL AT CORNER | • DESTINATION: NO CORRECTION<br>• GUIDANCE END: UNTIL TARGET PERSON RECOGNIZES DESTINATION | • DESTINATION: PREVIOUS CORNER<br>• GUIDANCE END: UNTIL AT LEAST ONE TARGET PERSON RECOGNIZES CORNER | • DESTINATION: PREVIOUS CORNER<br>• GUIDANCE END: UNTIL HALF OF TARGET PERSONS RECOGNIZE CORNER |
| LOW | • DESTINATION: NO CORRECTION<br>• GUIDANCE END: UNTIL TARGET PERSON RECOGNIZES DESTINATION | | | • DESTINATION: NO CORRECTION<br>• GUIDANCE END: UNTIL ARRIVAL AT DESTINATION | • DESTINATION: NO CORRECTION<br>• GUIDANCE END: UNTIL ARRIVAL AT DESTINATION | • DESTINATION: NO CORRECTION<br>• GUIDANCE END: UNTIL AT LEAST ONE TARGET PERSON RECOGNIZES DESTINATION | • DESTINATION: NO CORRECTION<br>• GUIDANCE END: UNTIL HALF OF TARGET PERSONS RECOGNIZE DESTINATION |

FIG. 15

| GUIDANCE LOCATION | DESTINATION | CORRECTED DESTINATION |
|---|---|---|
| STATION | TRAIN (NON-RESERVED SEAT) | STAIRCASE TO PLATFORM<br>GUIDANCE IS ENDED WHEN STAIRCASE IS SEEN |
| STATION | TRAIN (RESERVED SEAT) | STAIRCASE TO PLATFORM NEAREST TO PASSENGER CAR<br>GUIDANCE IS ENDED WHEN STAIRCASE IS SEEN<br>GUIDANCE IS ENDED WHEN PERSON WHO RIDES ON SAME TRAIN (RESERVED SEAT) IS FOUND |
| PUBLIC ROAD | FACILITY | GUIDANCE SIGNBOARD TO FACILITY<br>GUIDANCE IS ENDED WHEN GUIDANCE SIGNBOARD OR ENTRANCE OF FACILITY IS SEEN |
| AIRPORT | BOARDING GATE | CHECK-IN COUNTER<br>OR ENTRANCE OF SECURITY CHECKPOINT VIA CHECK-IN COUNTER<br>GUIDANCE IS ENDED WHEN CHECK-IN COUNTER IS SEEN<br>GUIDANCE IS ENDED WHEN PERSON WHO RIDES ON SAME FLIGHT IS FOUND |
| SIGHTSEEING SPOT | FAMOUS PLACE | GUIDANCE SIGNBOARD TO FAMOUS PLACE<br>GUIDANCE IS ENDED WHEN GUIDANCE SIGNBOARD IS SEEN<br>GUIDANCE IS ENDED WHEN FLOW OF PEOPLE HEADING FOR SAME DESTINATION IS FOUND |
| OFFICE | CONFERENCE ROOM | CLOSEST CONFERENCE ROOM ARRANGED IN SERIES TO DESTINATION |
| HOTEL | GUEST ROOM | ELEVATOR<br>OR CLOSEST GUEST ROOM ARRANGED IN SERIES TO DESTINATION |

INFORMATION PROCESSING DEVICE, INFORMATION PROCESSING METHOD, AND MOBILE DEVICE

CROSS REFERENCE TO RELATED APPLICATIONS

This application is a U.S. National Phase of International Patent Application No. PCT/JP2021/045902 filed on Dec. 13, 2021, which claims priority benefit of Japanese Patent Application No. JP 2020-214332 filed in the Japan Patent Office on Dec. 23, 2020. Each of the above-referenced applications is hereby incorporated herein by reference in its entirety.

TECHNICAL FIELD

The present technology relates to an information processing device, an information processing method, a program, and a mobile device, and specifically relates to an information processing device and the like which are provided in a mobile device that guides a guidance target, and are efficiently guide the guidance target.

BACKGROUND ART

In the related art, a robot that guides a human to a destination has been proposed. For example, Patent Document 1 describes a technology relating to a guide robot that guides a human along a route through which marks to the destination can be seen, explains the order of the route to the destination in a case where a point where the mark can be seen on the route is reached, and ends the guidance at a point of time in a case where the human understands the order of the route.

CITATION LIST

Patent Document

Patent Document 1: Japanese Patent Application Laid-Open No. 2007-260822

SUMMARY OF THE INVENTION

Problems to be Solved by the Invention

In the technology described in Patent Document 1, since guidance is ended at a point where a mark can be seen, there is a disadvantage that an elderly person or a person unfamiliar with the place (facility) gets lost after the guidance is ended. Note that, in the technology described in Patent Document 1, it is possible to communicate with a human as to whether to end the guidance, but it is troublesome for a person who wants to be reliably guided to the destination.

An object of the present technology is to efficiently perform necessary and sufficient guidance to a guidance target.

Solutions to Problems

A concept of the present technology is an information processing device included in a mobile device that guides a guidance target to a destination, the information processing device including:

a setting unit that sets any predetermined point among points from a guidance start point to the destination as a guidance end point on the basis of the destination of the guidance target and at least one or more of environment information of a guidance route, an attribute of the guidance target, and unique information of the guidance target.

An information processing device of the present technology is included in a mobile device that guides a guidance target to a destination. Here, the guidance target is a target, for example, a human guided to a destination by a mobile device, for example, a guide robot. In the present technology, a setting unit sets any predetermined point among points from a guidance start point to the destination of the guidance target as a guidance end point on the basis of the destination of the guidance target and at least one or more of environment information of a guidance route, an attribute of the guidance target, and unique information of the guidance target.

For example, the destination of the guidance target may include a predetermined facility or a predetermined point in the predetermined facility. Therefore, the mobile device can guide the guidance target to a predetermined facility or a predetermined point in the predetermined facility efficiently as necessary and sufficiently.

Furthermore, for example, in a case where the destination of the guidance target is a predetermined point in a predetermined facility, the environment information of the guidance route includes a type of the predetermined facility or a structural characteristic of the predetermined facility. Therefore, it is possible to set the guidance end point according to the type of the predetermined facility or the structural characteristic of the predetermined facility.

Furthermore, for example, in a case where the destination of the guidance target is a predetermined point in a predetermined facility, the unique information of the guidance target is information for acquiring a knowledge level regarding the predetermined facility. In this case, for example, the information for acquiring the knowledge level regarding the predetermined facility may include information of a history of visiting the predetermined point in the predetermined facility or the predetermined facility in the past. Therefore, it is possible to set the guidance end point according to the knowledge level regarding the predetermined facility.

Furthermore, for example, an attribute estimation unit that estimates an attribute of the guidance target on the basis of sensor information may be further provided. Therefore, it is possible to save time and effort for the guidance target, for example, a human to input his/her attributes, for example, an elderly person, a visually impaired person, a foreigner, a child, a group, and the like.

Furthermore, for example, the mobile device may include a guide robot. Therefore, the guide robot can guide the guidance target to the destination efficiently as necessary and sufficiently.

Furthermore, for example, the mobile device may guide the guidance target to the set guidance end point. Therefore, it is possible to guide the guidance target to the set guidance end point by the mobile device.

Furthermore, for example, the mobile device may guide the guidance target to any predetermined point among points from the guidance start point to the set guidance end point, at which the mobile device hands over the guidance to another mobile device that guides the guidance target to the set guidance end point. Therefore, it is possible to guide the guidance target to the set guidance end point by cooperation of the mobile device and another mobile device.

Furthermore, for example, the guidance target may be a plurality of guidance targets having a same destination.

Therefore, the mobile device can guide the plurality of guidance targets, for example, a human group, to the destination efficiently as necessary and sufficiently.

In the present technology, any predetermined point among points from a guidance start point to the destination of the guidance target is set as a guidance end point on the basis of the destination of the guidance target and at least one or more of environment information of a guidance route, an attribute of the guidance target, and unique information of the guidance target. Therefore, the mobile device can guide the guidance target to the destination efficiently as necessary and sufficiently.

Note that, in the present technology, for example, a determination unit may be further provided, which determines a point different from the set guidance end point as a guidance end point on the basis of a predetermined condition after guidance is started. Therefore, the mobile device can guide the guidance target to the destination more efficiently as necessary and sufficiently.

In this case, for example, the predetermined condition may include an estimation that the guidance target has recognized the destination of the guidance target. Therefore, it is possible to determine a point where it is estimated that the guidance target has recognized the destination can be determined as the guidance end point, and the guidance of the mobile device can be performed more efficiently as necessary and sufficiently.

Furthermore, in this case, for example, the predetermined condition may include that a flow of another target different from the guidance target, heading for a same destination as the destination of the guidance target, is found. Therefore, it is possible to determine a point at which another target different from the guidance target, heading for the destination, is found, as the guidance end point, and the guidance of the mobile device can be performed more efficiently as necessary and sufficiently.

For example, the finding of the other target may be performed on the basis of a moving direction of the other target and statistical information regarding the destination of the guidance target. Furthermore, for example, the finding of the other target may be performed on the basis of destination information acquired from a terminal held by the other target. As a result, it is possible to satisfactorily find another target different from the guidance target, heading for the destination.

Furthermore, in this case, the predetermined condition may include that another mobile device that guides another guidance target to a same destination as the destination of the guidance target is found. Therefore, it is possible to determine a point where another mobile device that guides another guidance target to a same destination as the destination of the guidance target is found, as the guidance end point, and the guidance of the mobile device can be performed more efficiently as necessary and sufficiently.

Furthermore, in the present technology, for example, the setting unit may further set a guidance route and a guidance method which are for guiding the guidance target, on the basis of the destination of the guidance target, and at least one or more of the environment information of the guidance route, the attribute of the guidance target, and the unique information of the guidance target. Therefore, the mobile device can satisfactorily guide the guidance target to the destination.

Furthermore, another concept of the present technology is an information processing method including:

a procedure of setting any predetermined point among points from a guidance start point to a destination of a guidance target as a guidance end point on the basis of the destination of the guidance target and at least one or more of environment information of a guidance route, an attribute of the guidance target, and unique information of the guidance target.

Furthermore, another concept of the present technology is a program causing a computer to function as:

a setting unit that sets any predetermined point among points from a guidance start point to a destination of a guidance target as a guidance end point on the basis of the destination of the guidance target and at least one or more of environment information of a guidance route, an attribute of the guidance target, and unique information of the guidance target.

Furthermore, another concept of the present technology is a mobile device that includes an information processing device, and guides a guidance target to a destination, in which the information processing device includes a setting unit that sets any predetermined point among points from a guidance start point to the destination of the guidance target as a guidance end point on the basis of the destination of the guidance target and at least one or more of environment information of a guidance route, an attribute of the guidance target, and unique information of the guidance target.

BRIEF DESCRIPTION OF DRAWINGS

FIG. 6 is a diagram illustrating an example of setting of a guidance route and a guidance method according to an attribute of a target person.

FIG. 9 is a diagram illustrating a change example of a destination and guidance end determination based on an attribute of a target person and a knowledge level of the target person regarding a facility.

FIG. 15 is a diagram illustrating an example of destination correction depending on guidance locations.

MODE FOR CARRYING OUT THE INVENTION

Hereinafter, modes for carrying out the present invention (hereinafter, referred to as embodiments) will be described. Note that the description will be given in the following order.
1. Embodiments
2. Modification Example 1. Embodiments

[Outline of Present Technology]

Figure 1:
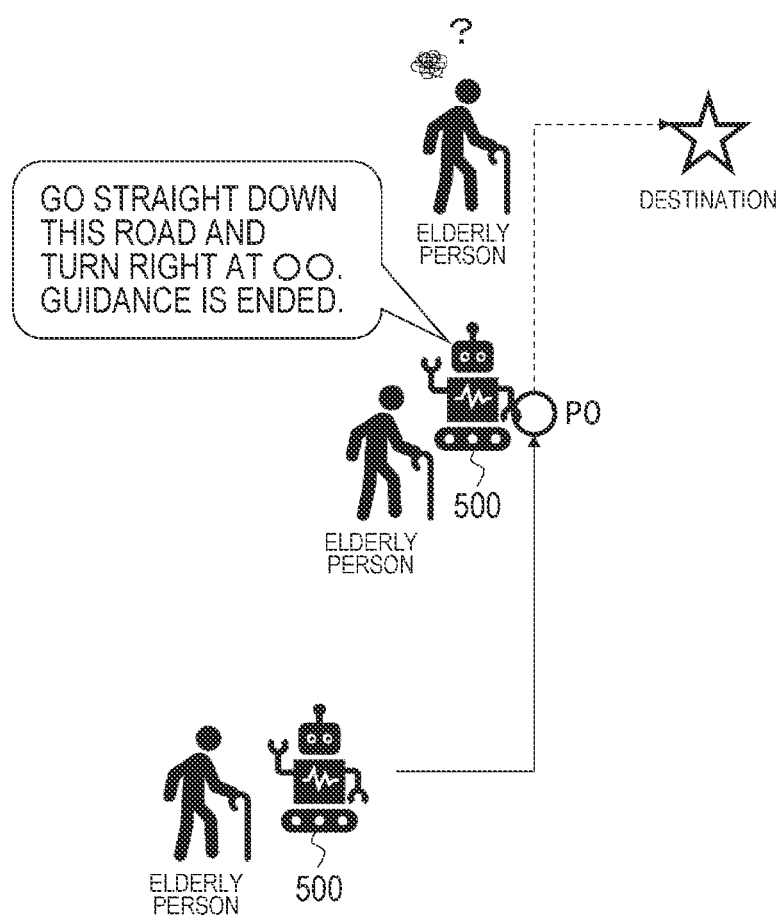
FIG. 1 is a diagram illustrating an example in which a guide robot guides an elderly person as a guidance target, to a destination.

FIG. 1 illustrates an example in which a guide robot 500 guides an elderly person as a guidance target, to a destination. In this example, the guide robot 500 ends the guidance at a point P0 where a mark for the destination can be seen, thereby improving the efficiency of the guidance. In this case, since the elderly person for which the guidance has been ended at the point P0 has low cognitive ability, it is conceivable that the elderly person will get lost after the guidance by the guide robot 500 is ended. Note that, in this case, the guide robot 500 can communicate with the elderly person as to whether to end the guidance at the point P0, but it is troublesome for the elderly person who wants to be reliably guided to the destination.

Therefore, in the present technology, it is configured such that any predetermined point of points from a guidance start point to the destination is set as a guidance end point on the basis of the destination of the guidance target and at least one or more of environment information of a guidance route, an attribute of the guidance target, and unique information of the guidance target, and the mobile device can guide the guidance target to the destination efficiently as necessary and sufficiently.

For example, the destination of the guidance target includes a predetermined facility or a predetermined point in the predetermined facility. For example, in a case where the destination of the guidance target is the predetermined point in the predetermined facility, the environment information of the guidance route includes a type of the predetermined facility or a structural characteristic of the predetermined facility. Furthermore, for example, in a case where the destination of the guidance target is the predetermined point in the predetermined facility, the unique information of the guidance target is information for acquiring a knowledge level regarding the predetermined facility. Furthermore, for example, the information for acquiring the knowledge level regarding the predetermined facility includes information of a history of visiting the predetermined point in the predetermined facility or the predetermined facility in the past.

Figure 2:
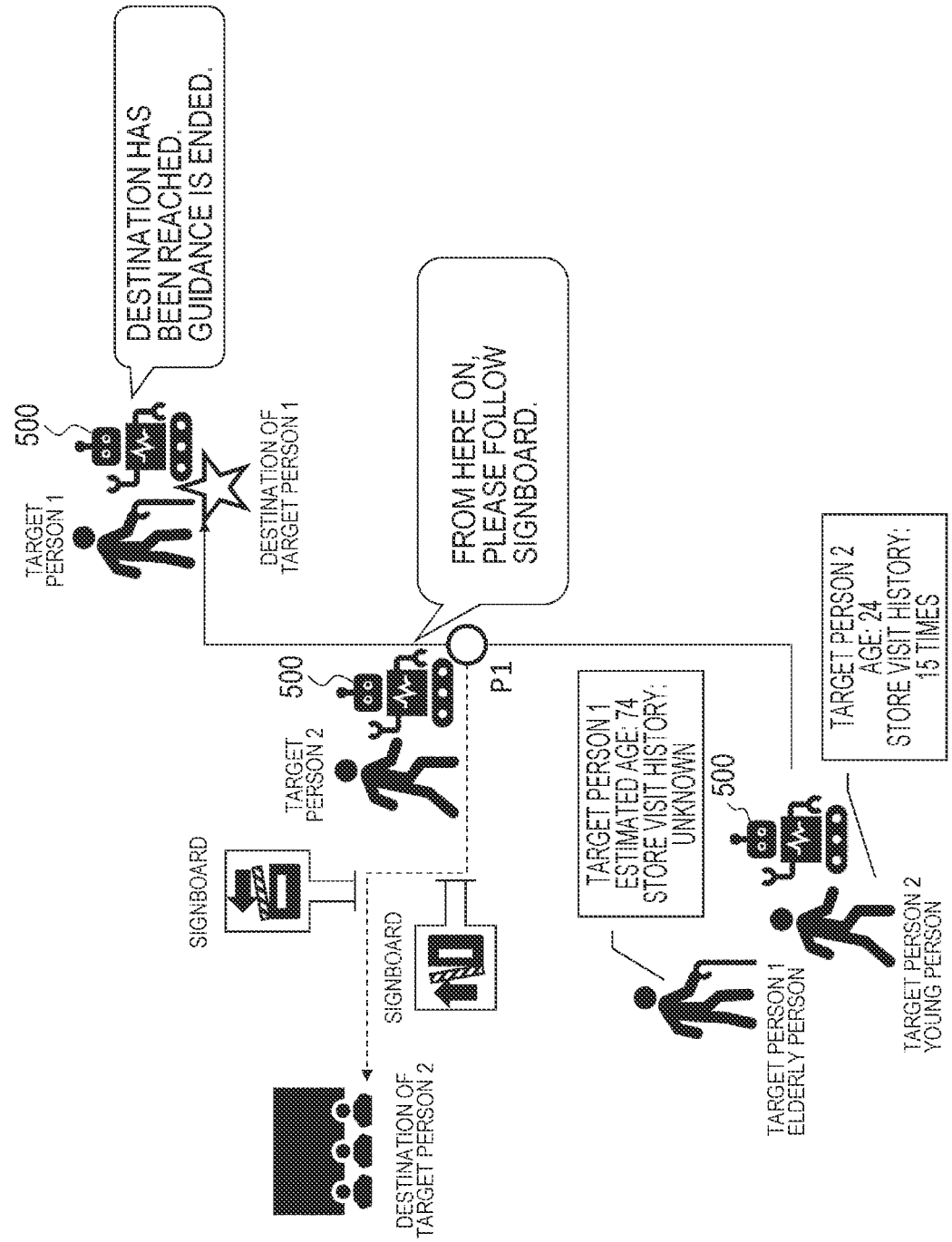
FIG. 2 is a diagram illustrating an example in which a guide robot guides a target person 1 and a target person 2 as the guidance target, to respective destinations.

FIG. 2 illustrates an example in which the guide robot 500 guides a target person 1 and a target person 2 as the guidance target, to respective destinations. Here, it is assumed that the target person 1 is an elderly person and has an unknown store visit history to the destination (store) in the facility, and the target person 2 is a young person and has a store visit history to the destination (store) in the facility of 15 times.

In this case, regarding the target person 1, since it is estimated that the knowledge level regarding the facility is low and the cognitive ability is low, the guide robot 500 sets the destination of the target person 1 as the guidance end point, and guides the target person 1 to the guidance end point. In this case, the guide robot 500 instructs the target person 1, "The destination has been reached. The guidance is ended.", for example.

Regarding the target person 2, since it is estimated that the knowledge level regarding the facility is high and the cognitive ability is high, the guide robot 500 sets a signboard relating to the destination of the target person 2 as the guidance end point, and guides the target person 2 to the guidance end point. In this case, the guide robot 500 instructs the target person 2, "From here on, please follow the signboard", for example.

Furthermore, in the present technology, it is configured such that a point different from the set guidance end point is determined as a guidance end point on the basis of a predetermined condition after the guidance is started, and the mobile device can guide the guidance target to the destination more efficiently as necessary and sufficiently.

Here, the predetermined condition is that it is estimated that the guidance target has been able to recognize the destination, that a target who is heading for the same destination as the destination of the guidance target and is different from the guidance target is found, that another mobile device that is guiding another guidance target to the same destination as the destination of the guidance target is found, and the like.

Figure 3:
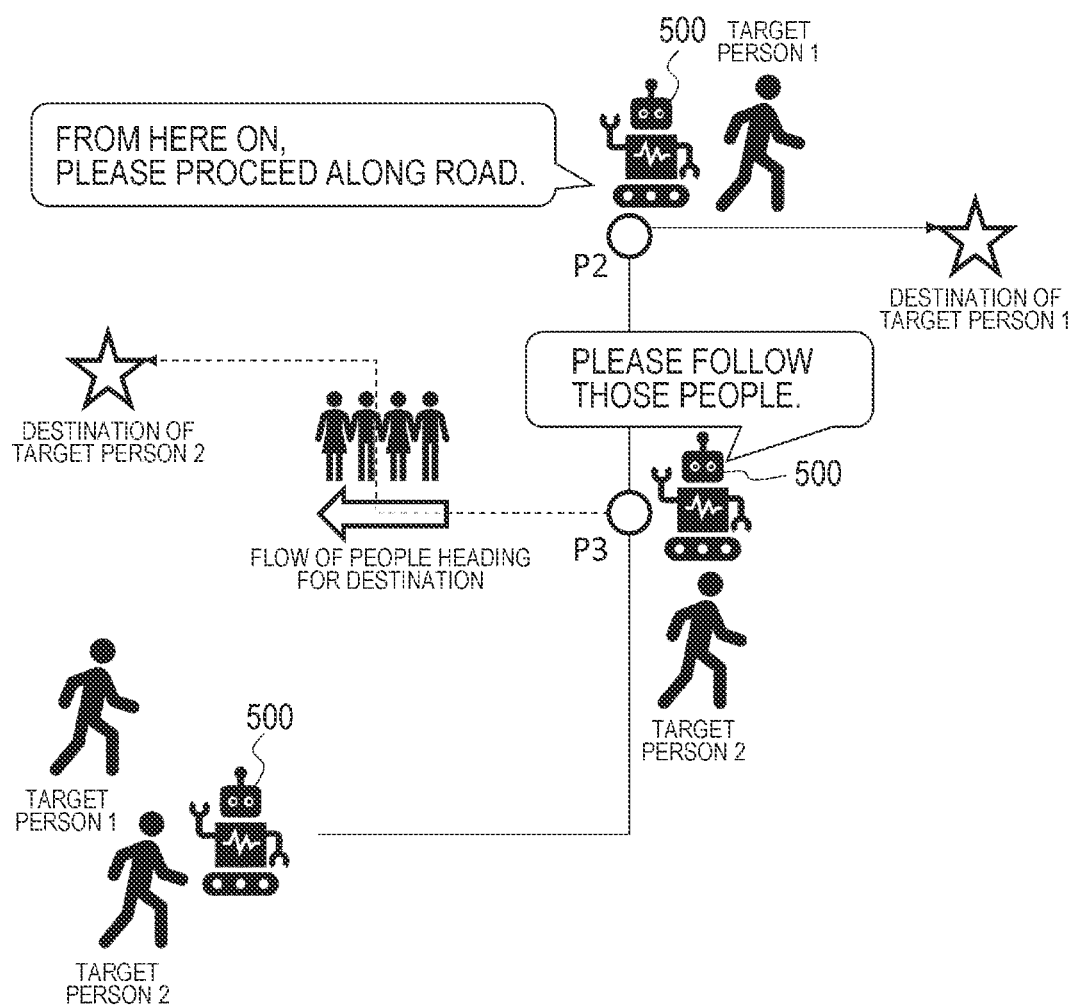
FIG. 3 is a diagram illustrating an example in which a guide robot guides a target person 1 and a target person 2 as the guidance target, to respective destinations.

FIG. 3 illustrates an example in which the guide robot 500 guides a target person 1 and a target person 2 as the guidance target, to respective destinations. Here, it is assumed that the destination of the target person 1 is set as the guidance end point of the target person 1, and the destination of the target person 2 is set as the guidance end point of the target person 2.

In this case, regarding the target person 1, the guide robot 500 guides the target person 1 to a point P2 where the target person 1 is estimated to have recognized the destination of the target person 1. In this case, the guide robot 500 instructs the target person 1, "From here on, please proceed along the road.", for example.

The target person 2 is guided to a point P3 where a flow of people heading for the same destination as the destination of the target person 2 is found. In this case, the guide robot 500 instructs the target person 2, "Please follow those people.", for example.

Furthermore, in the present technology, it is configured such that a guidance route and a guidance method for guiding the guidance target are set on the basis of the destination of the guidance target and at least one or more of environment information of the guidance route, an attribute of the guidance target, and unique information of the guidance target, and the mobile device can successfully guide the guidance target to the destination.

"Hardware Configuration of Guide Robot"

Figure 4:
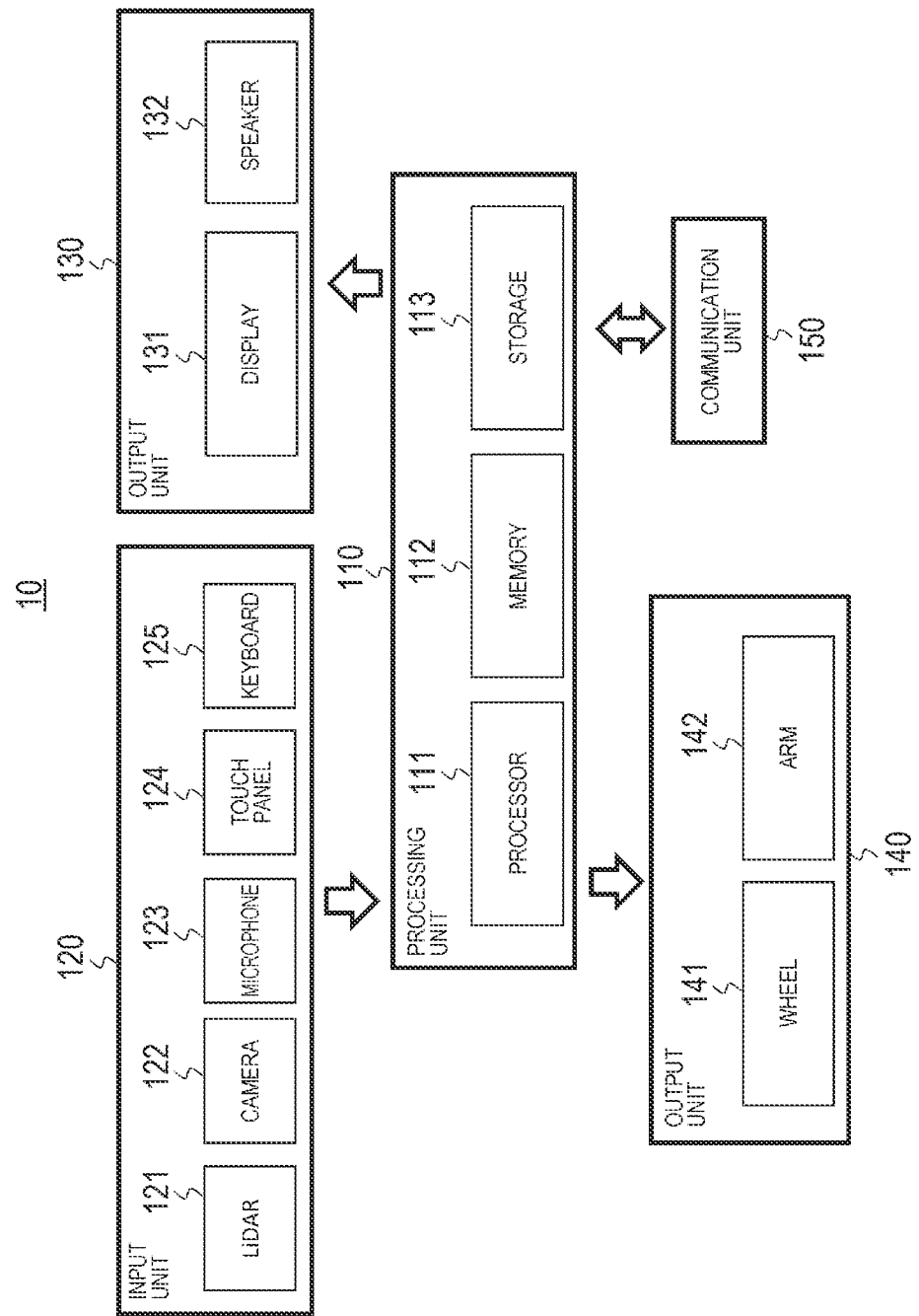
FIG. 4 is a block diagram illustrating an example of a hardware configuration of a guide robot as a mobile device.

FIG. 4 illustrates an example of a hardware configuration of a guide robot 10 as the mobile device. In the present embodiment, the guide robot 10 guides a target person as the guidance target (a person to be guided) to a store that is the destination of the target person inside a shopping mall as a facility.

The guide robot 10 has a processing unit 110, an input unit 120, an output unit 130, an output unit 140, and a communication unit 150. The processing unit 110 includes a processor 111, a memory 112, a storage 113, and the like. The processor 111 is operated on the basis of a control program stored in the memory 112 or the storage 113, and controls each unit of the guide robot 10.

The memory 112 temporarily or permanently stores a control program read by the processor 111, various parameters that are appropriately changed in a case of executing the program, and the like. The storage 113 includes, for example, a magnetic storage device such as a hard disk drive (HDD), a semiconductor storage device, and the like. Various kinds of data are stored.

In the present embodiment, the various kinds of data include an in-facility map, movie showing time information in a store (movie theater) in the facility, sale start information of a store with sales in the facility, statistical information of a customer attraction ability of each store in the facility, statistical information of the number of customers attracted per hour of each store in the facility, and the like. Here, the in-facility map includes structural characteristic information of the facility.

The input unit 120 includes a light detection and ranging (LiDAR) 121, a camera 122, a microphone 123, a touch panel 124, a keyboard 125, and the like. The LiDAR 121 scans the surroundings with laser light to detect a distance to surrounding objects. The camera 122 images the target person, and also images the surroundings.

The microphone 123 collects speech of the target person. The touch panel 124 is configured by arranging a touch switch on a surface of a flat type display, and detects a touch position by the target person. The keyboard 125 constitutes an operator of the target person together with the touch panel 124.

The output unit 130 is used to communicate with the target person. The output unit 130 includes a display 131, a speaker 132, and the like. The display 131 is a flat type display such as a liquid crystal display or an organic EL, and displays various screens. The touch panel 124 is disposed on the surface of the display. The speaker 132 outputs a voice instruction and the like to the target person. The output unit 140 constitutes an actuator. The output unit 140 includes a wheel 141, an arm 142, and the like. The communication unit 150 communicates with an external device.

The processor 111 acquires a destination of the target person (person), and guides the target person to the destination. For example, the processor 111 acquires the destination on the basis of destination information of the target person obtained by performing voice recognition processing on speech information of the target person, or destination information obtained by operating the touch panel 124 or the keyboard 125.

Furthermore, the processor 111 acquires the knowledge level of the target person regarding the facility. For example, the processor 111 estimates and acquires the knowledge level of the target person regarding the facility on the basis of store visit history information to the destination (store) obtained by the communication unit 150 accessing a possessed terminal of the target person, store visit history information to the destination (store) input by the target person operating the touch panel 124 or the keyboard 125, or store visit history information to the destination (store) obtained by performing the voice recognition processing on the speech information of the target person. Note that, instead of the store visit history information to the destination (store), store visit history information to the facility (shopping mall) itself may be used.

Furthermore, for example, the processor 111 acquires the knowledge level of the target person regarding the facility on the basis of knowledge level information regarding the facility input by the target person operating the touch panel 124 or the keyboard 125 or knowledge level information of the target person regarding the facility obtained by performing the voice recognition processing on the speech information of the target person.

Furthermore, the processor 11 acquires the attribute of the target person. Here, the attribute of the target person is a young person, an elderly person, a visually impaired person, a foreigner, a child, an intimate customer group, a non-intimate customer group, or the like. Here, the customer group includes a plurality of target persons (persons) having the same destination. For example, the processor 111 estimates and acquires the attribute of the target person by performing image recognition processing on image information of the target person or performing voice recognition processing on the speech information of the target person. Furthermore, for example, the processor 111 acquires the attribute of the target person on the basis of attribute information input by the target person operating the touch panel 124 or the keyboard 125. In the attribute of the target person, the cognitive ability of the target person also serves as a material for determining exercise ability.

Next, after acquiring the destination of the target person, the knowledge level of the target person regarding the facility, and the attribute of the target person as described above, the processor 111 corrects the destination according to the structural characteristics of the facility, the knowledge level of the target person regarding the facility, and the attribute of the target person, sets the guidance route and the guidance method for guiding the target person, and then starts the guidance for the target person.

Here, the destination is not necessarily corrected, and may not be corrected. Furthermore, as the guidance route, a route such as the shortest distance, avoiding a step, along a braille block, with many people, or giving priority to a main street is selectively set. Furthermore, as the guidance method, a high speed, a medium speed, a low speed, a low speed and voice guidance (temporary stop or turn) at a corner, or the like is selectively set.

Figure 5:
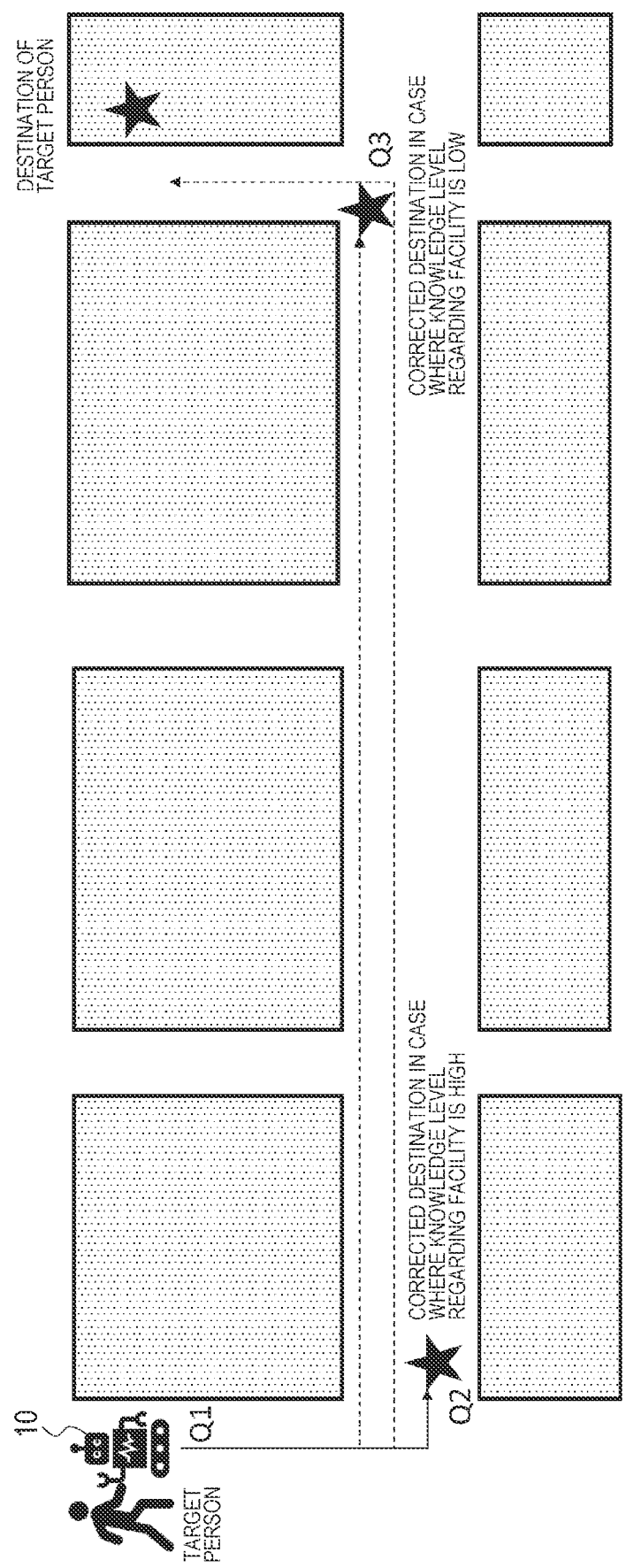
FIG. 5 is a diagram illustrating an example of correcting a destination based on a knowledge level of a target person regarding a facility.

FIG. 5 illustrates an example of correcting the destination based on the knowledge level of the target person regarding the facility. The guide robot 10 acquires the destination of the target person at a guidance start point Q1. Then, in a case where the knowledge level of the target person regarding the facility is high, the guide robot 10 performs correction to set a point relatively far from the destination of the target person, for example, a point Q2 on the main street as the destination. On the other hand, in a case where the knowledge level of the target person regarding the facility is low, the guide robot 10 performs correction to set a point close to the destination of the target person, for example, a point Q3 at the last corner as the destination.

FIG. 6 illustrates an example of setting of the guidance route and the guidance method according to the attribute of the target person. In a case where the attribute of the target person is a "young person", the recognition is performed by, for example, image recognition or acquisition of information from the possessed terminal, the guidance route is set to a route having the shortest distance, and the guidance method is set to a high speed. Furthermore, in a case where the attribute of the target person is an "elderly person", the recognition is performed by, for example, image recognition or acquisition of information from the possessed terminal, the guidance route is set to a route avoiding a step, and the guidance method is set to a low speed.

Furthermore, in a case where the attribute of the target person is a "visually impaired person", the recognition is performed by, for example, image recognition (white cane, guide dog), the guidance route is set to a route along the braille block, and the guidance method is set to a low speed and voice guidance (temporary stop or turn) at a corner. Furthermore, in a case where the attribute of the target person is a "foreigner", the recognition is performed by, for example, language at the time of destination input or voice recognition, the guidance route is set to a route having the shortest distance (route priority with a guidance signboard in a native language), and the guidance method is set to a high speed.

Furthermore, in a case where the attribute of the target person is a "child", the recognition is performed by, for example, image recognition, the guidance route is set to a route with many people, and the guidance method is set to a low speed. Furthermore, in a case where the attribute of the target person is an intimate customer group, the recognition is performed by, for example, voice recognition (conversation amount in the group), the guidance route is set to a route giving priority to a main street, and the guidance method is set to a medium speed. Furthermore, in a case where the attribute of the target person is a non-intimate customer group, the recognition is performed by, for example, voice recognition (conversation amount in the group), the guidance route is set to a route giving priority to a main street, and the guidance method is set to a medium speed.

In a case where the processor 111 guides the target person and arrives at the guidance end point (the destination of the target person in a case where the destination is not corrected, and the corrected destination in a case where the destination is corrected), the processor instructs the target person to take an action to the destination of the target person, and ends the guidance for the target person.

Here, in a case where it is determined that the target person can recognize the destination (original destination) of the target person before the target person is guided to arrive at the guidance end point, the processor 111 sets the determination point as the guidance end point, instructs the target person to take an action to the destination of the target person, and ends the guidance for the target person.

In this case, the processor 111 estimates a destination recognition state of the target person by performing image recognition processing on the image information of the target person or performing voice recognition processing on the speech information of the target person, and determines that the target person can recognize the destination (original destination) of the target person in a case where the recognition state is equal to or greater than a threshold value.

Furthermore, in this case, in a case where a flow of people different from the target person, heading for the same destination as the destination of the target person is found, the processor 111 determines that the target person can recognize the destination (original destination) of the target person. For example, the processor 111 finds the flow of people different from the target person on the basis of the flow direction of the people different from the target person and the statistical information regarding the destination of the target person.

Figure 7:
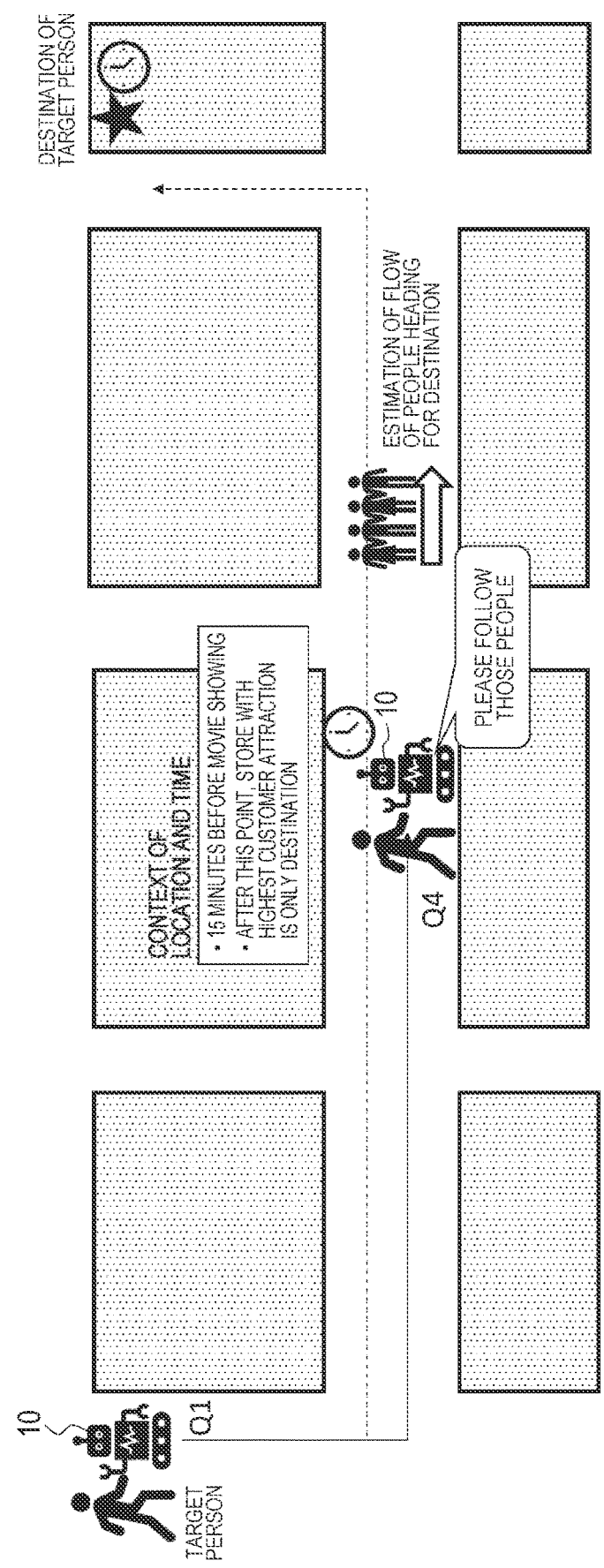
FIG. 7 is a diagram illustrating an example of estimating a flow of people heading for the same destination as the destination of a target person.

FIG. 7 illustrates an example of estimating the flow of people heading for the same destination as the destination of the target person. In this case, the processor 111 observes the flow of people on the basis of the image information around the guide robot 10, and estimates the flow of people heading for the same destination as the destination of the target person. In this case, the flow of people heading for the same destination as the destination of the target person is estimated on the basis of context information such as movie showing time, sale start information, and statistical information of the customer attraction ability of each store.

In the illustrated example, the guide robot 10 finds the flow of people heading in the same direction as the destination of the target person at a point of time when the guide robot 10 has guided the target person from the guidance start point Q1 to a point Q4, but, for example, estimates that the flow of people as the flow of people heading for the same destination as the destination of the target person on the basis of information such as "15 minutes before movie showing" or "after this point, the store with the highest customer attraction is only the destination of the target person". Then, at the point Q4, the guide robot 10 instructs the target person, for example, "Please follow those people", and ends the guidance for the target person.

Figure 8:
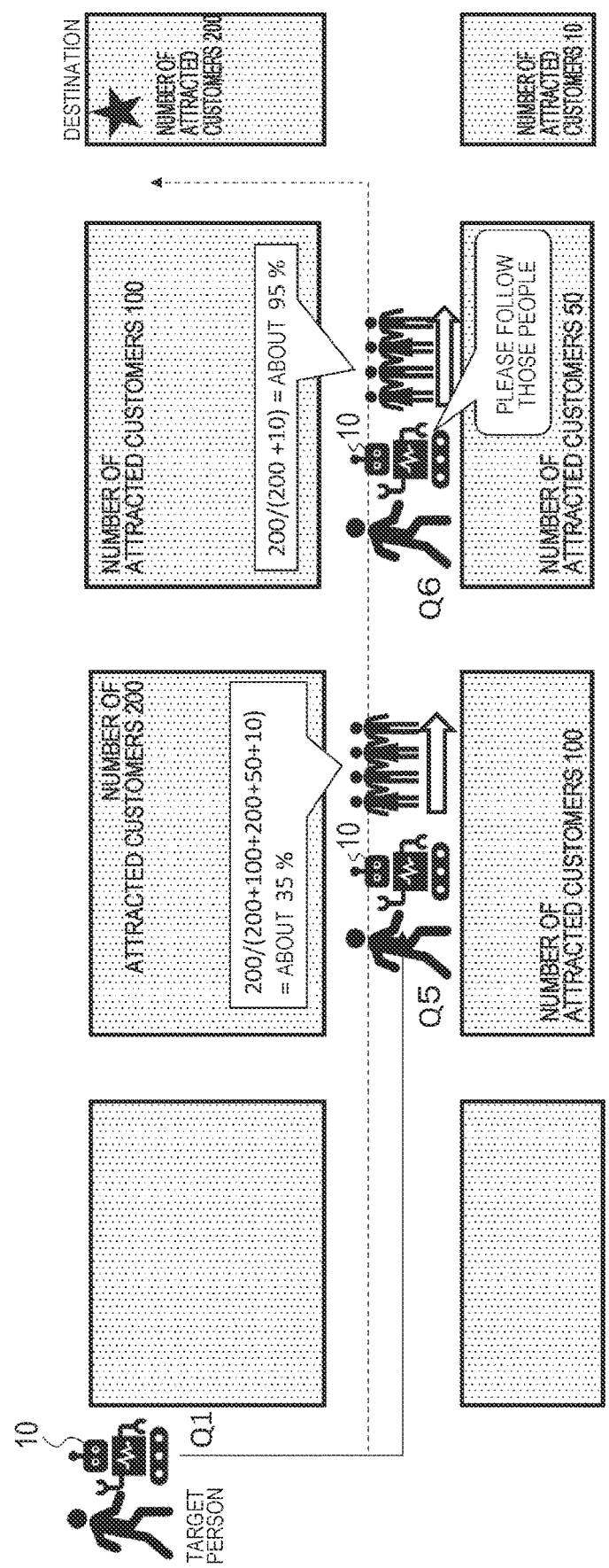
FIG. 8 is a diagram illustrating another example of estimating a flow of people heading for the same destination as the destination of a target person.

FIG. 8 also illustrates an example of estimating the flow of people heading for the same destination as the destination of the target person. In this case, the processor 111 observes the flow of people on the basis of the image information around the guide robot 10, and estimates the flow of people heading for the same destination as the destination of the target person on the basis of the statistical information of the number of customers attracted per hour of each store. In this case, a probability of the destination of the flow of people heading in the same direction as the destination of the target person is estimated by dividing the number of customers attracted at the destination of the target person by the total number of customers attracted at all stores ahead in the traveling direction of the people, and in a case where the probability is equal to or greater than a threshold value, for example, 80% or more, it is estimated that the flow of people as the flow of people heading for the same destination as the destination of the target person.

In the illustrated example, the guide robot 10 finds the flow of people heading in the same direction as the destination of the target person at a point of time when the guide robot 10 has guided the target person from the guidance start point Q1 to a point Q5, but, for example, estimates that the flow of people is not a flow of people heading for the same destination as the destination of the target person since the probability is about 35% (=200/(200+100+200+50+10)× 100%) and is not equal to or greater than the threshold value (80%).

Next, the guide robot 10 finds the flow of people heading in the same direction as the destination of the target person at a point of time when the guide robot 10 has guided the target person from the point Q5 to a point Q6, but, for example, estimates that the flow of people is a flow of people heading for the same destination as the destination of the target person since the probability is about 95% (=200/(200+ 10)×100%) and is equal to or greater than the threshold value (80%). Then, at the point Q6, the guide robot 10 instructs the target person, for example, "Please follow those people", and ends the guidance for the target person.

Furthermore, for example, it is also conceivable that the processor 111 finds a flow of people different from the target person, heading for the same destination as the destination of the target person on the basis of destination information in a case where the destination information can be acquired from a terminal held by the people different from the target person.

Furthermore, in this case, in a case where another guide robot guiding another target person to the same destination as the destination of the target person is found, the processor 111 determines that the target person can recognize the destination (original destination) of the target person. In this case, the processor 111 can recognize that the other guide robot is guiding the other target person to the same destination as the destination of the target person, for example, by communication with the other guide robot. In this case, the guide robot 10 instructs the target person, for example, "After this, please have the guide robot 10 to guide you to the destination" at the point where the other guide robot is found, and ends the guidance for the target person.

FIG. 9 illustrates a change example of a destination and guidance end determination based on the attribute of the target person and the knowledge level of the target person regarding the facility.

A case where the attribute of the target person is a "young person" will be described. In a case where the knowledge level is a low level, the destination is "no correction", and the guidance end is "until arrival at the destination". Furthermore, in a case where the knowledge level is a medium level, the destination is "no correction", and the guidance end is "until the target person recognizes a corner". Furthermore, in a case where the knowledge level is a high level, the destination is a "guidance signboard", and the guidance end is "until the target person recognizes the guidance signboard".

Next, a case where the attribute of the target person is a "child" will be described. In a case where the knowledge level is a low level, the destination is "no correction", and the guidance end is "until arrival at the destination". Furthermore, in a case where the knowledge level is a medium level, the destination is "no correction", and the guidance end is "until the target person recognizes the destination". Furthermore, in a case where the knowledge level is a high level, the destination is "the previous corner", and the guidance end is "until the target person can see the end of the corner".

Next, a case where the attribute of the target person is a "visually impaired person" will be described. In a case where the knowledge level is a low level, the destination is "no correction", and the guidance end is "until arrival at the destination". Furthermore, in a case where the knowledge level is a medium level, the destination is "no correction", and the guidance end is "until arrival at the destination". Furthermore, in a case where the knowledge level is a high level, the destination is "no correction", and the guidance end is "until arrival at the destination".

Next, a case where the attribute of the target person is an "elderly person" will be described. In a case where the knowledge level is a low level, the destination is "no correction", and the guidance end is "until arrival at the destination". Furthermore, in a case where the knowledge level is a medium level, the destination is "the previous corner", and the guidance end is "until arrival at the corner". Furthermore, in a case where the knowledge level is a high level, the destination is a "guidance signboard", and the guidance end is "until arrival at the guidance signboard".

Next, a case where the attribute of the target person is a "foreigner" will be described. In a case where the knowledge level is a low level, the destination is "no correction", and the guidance end is "until arrival at the destination". Furthermore, in a case where the knowledge level is a medium level, the destination is "no correction", and the guidance end is "until the target person recognizes the destination". Furthermore, in a case where the knowledge level is a high level, the destination is "no correction" or a "guidance signboard in a native language", and the guidance end is "until the target person recognizes the destination or the guidance signboard".

Next, a case where the attribute of the target person is an "intimate customer group" will be described. In a case where the knowledge level is a low level, the destination is "no correction", and the guidance end is "until at least one target person checks the destination". Furthermore, in a case where the knowledge level is a medium level, the destination is "the previous corner", and the guidance end is "until at least one target person checks the corner". Furthermore, in a case where the knowledge level is a high level, the destination is a "guidance signboard", and the guidance end is "until at least one target person checks the guidance signboard".

Next, a case where the attribute of the target person is a "non-intimate customer group" will be described. In a case where the knowledge level is a low level, the destination is "no correction", and the guidance end is "until half of the target persons check the destination". Furthermore, in a case where the knowledge level is a medium level, the destination is "the previous corner", and the guidance end is "until half of the target persons check the corner". Furthermore, in a case where the knowledge level is a high level, the destination is a "guidance signboard", and the guidance end is "until half of the target persons check the guidance signboard".

Note that, in the example illustrated in FIG. 9, the knowledge level of the target person regarding the facility is divided into three stages, but the number of stages of the knowledge level is not limited to this, and for example, it is also conceivable to further divide the stages more finely. Furthermore, the number of stages may be different according to the attribute of the target person.

"Functional Configuration of Information Processing Device Including Processor"

Figure 10:
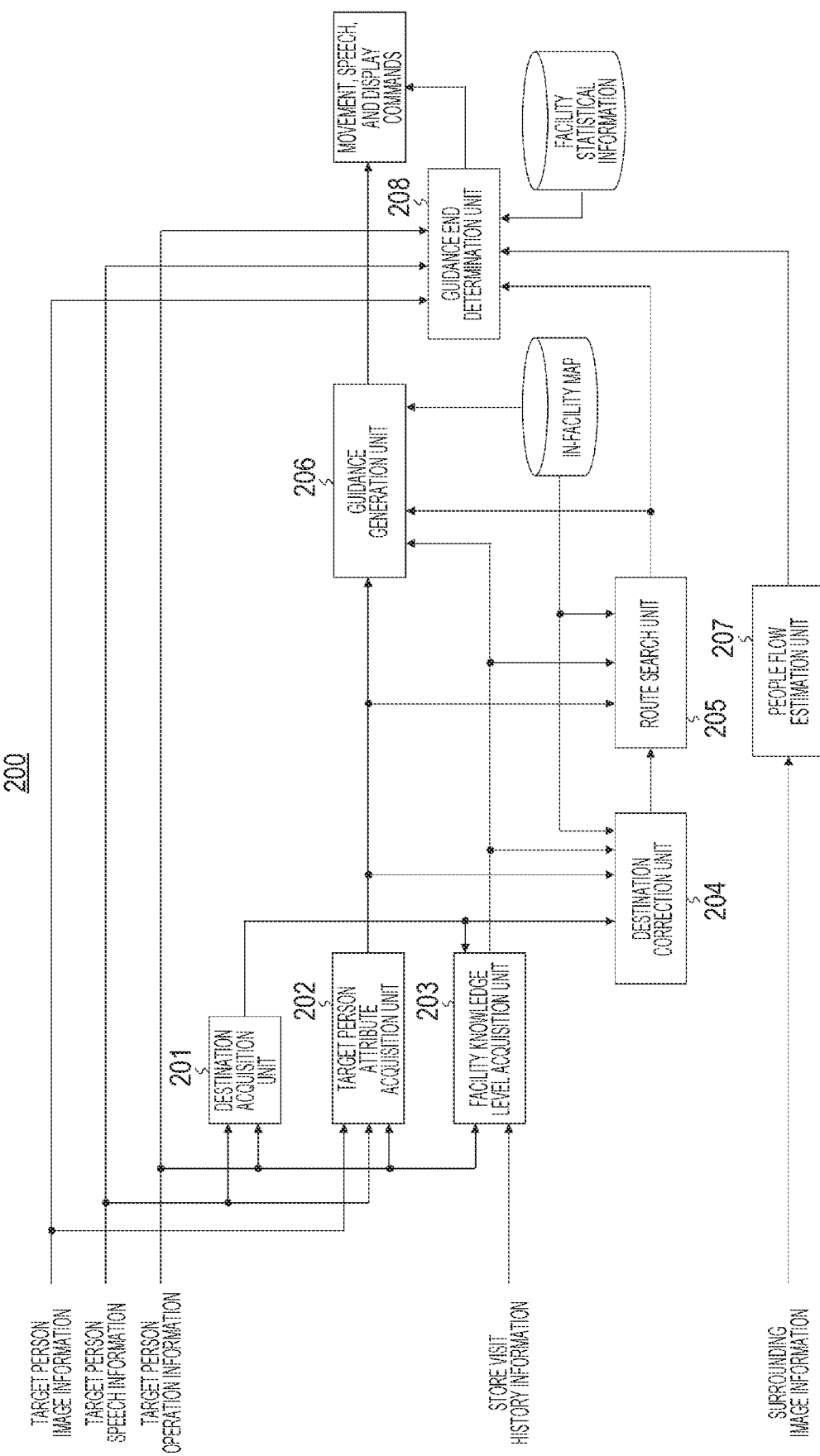
FIG. 10 is a block diagram illustrating an example of a functional configuration of an information processing device including a processor.

FIG. 10 illustrates an example of a functional configuration of an information processing device 200 including the processor 111 (refer to FIG. 4). The information processing device 200 includes a destination acquisition unit 201, a target person attribute acquisition unit 202, a target person knowledge level acquisition unit 203, a destination correction unit 204, a route search unit 205, a guidance generation unit 206, a people flow estimation unit 207, and a guidance end determination unit 208.

The destination acquisition unit 201 acquires the destination of the target person on the basis of the destination information obtained by performing voice recognition processing on target person speech information of the target person, or target person operation information (destination information) obtained by operating the touch panel 124 or the keyboard 125.

The target person attribute acquisition unit 202 estimates and acquires the attribute of the target person by performing image recognition processing on target person image information or performing voice recognition processing on the target person speech information. Alternatively, the target person attribute acquisition unit 201 acquires the attribute of the target person on the basis of the target person operation information (attribute input information) obtained by the target person operating the touch panel 124 or the keyboard 125.

The facility knowledge level acquisition unit 203 estimates and acquires the knowledge level of the target person regarding the facility on the basis of the store visit history information to the destination (store) obtained by the communication unit 150 accessing the possessed terminal of the target person, the store visit history information to the destination (store) input by the target person operating the touch panel 124 or the keyboard 125, or the store visit history information to the destination (store) obtained by performing the voice recognition processing on the target person speech information. Alternatively, the facility knowledge level acquisition unit 202 acquires the knowledge level of the target person regarding the facility on the basis of the knowledge level information regarding the facility input by the target person operating the touch panel 124 or the keyboard 125 or the knowledge level information of the target person regarding the facility obtained by performing the voice recognition processing on the target person speech information.

The destination correction unit 204 corrects the destination according to the structural characteristics of the facility, the attribute of the target person acquired by the target person attribute acquisition unit 202, and the knowledge level of the target person regarding the facility acquired by the facility knowledge level acquisition unit 203 (refer to FIG. 9). In this case, the destination is corrected so that the guidance can be ended early on the basis of the knowledge level of the target person regarding the facility and the attribute of the target person. In this case, the destination may not be corrected.

The route search unit 205 sets the guidance route with reference to the in-facility map according to the destination corrected by the destination correction unit 204, the attribute of the target person acquired by the target person attribute acquisition unit 202, and the knowledge level of the target person regarding the facility acquired by the facility knowledge level acquisition unit 203 (refer to FIG. 6). In this case, an appropriate route to the destination is set.

The guidance generation unit 206 sets a guidance method on the guidance route, that is, a moving speed, a speech content to the target person, an image display content, and the like with reference to the in-facility map according to the attribute of the target person acquired by the target person attribute acquisition unit 202, the knowledge level of the target person regarding the facility acquired by the facility knowledge level acquisition unit 203, and the guidance route generated by the route search unit 205, and generates movement, speech, and display commands for output devices (output units 130 and 140) of the guide robot 10.

The people flow estimation unit 207 estimates movement of people on the basis of the surrounding image information (image information for a plurality of consecutive frames), and acquires the number of people moving around and the moving direction.

The guidance end determination unit 208 estimates the possibility that the target person can reach the destination from the reaction of the target person, the flow of people on the guidance route, the distribution information of people in the facility, and the like according to the target person image information, the target person speech information, the target person operation information, the guidance route set by the route search unit 205, the number of people moving around and the moving direction estimated by the people flow estimation unit 207, the facility statistical information, and the like, and generates speech, screen display, and stop commands and the like for the guidance end.

"Guidance Processing Flow in Processor"

Figure 11:
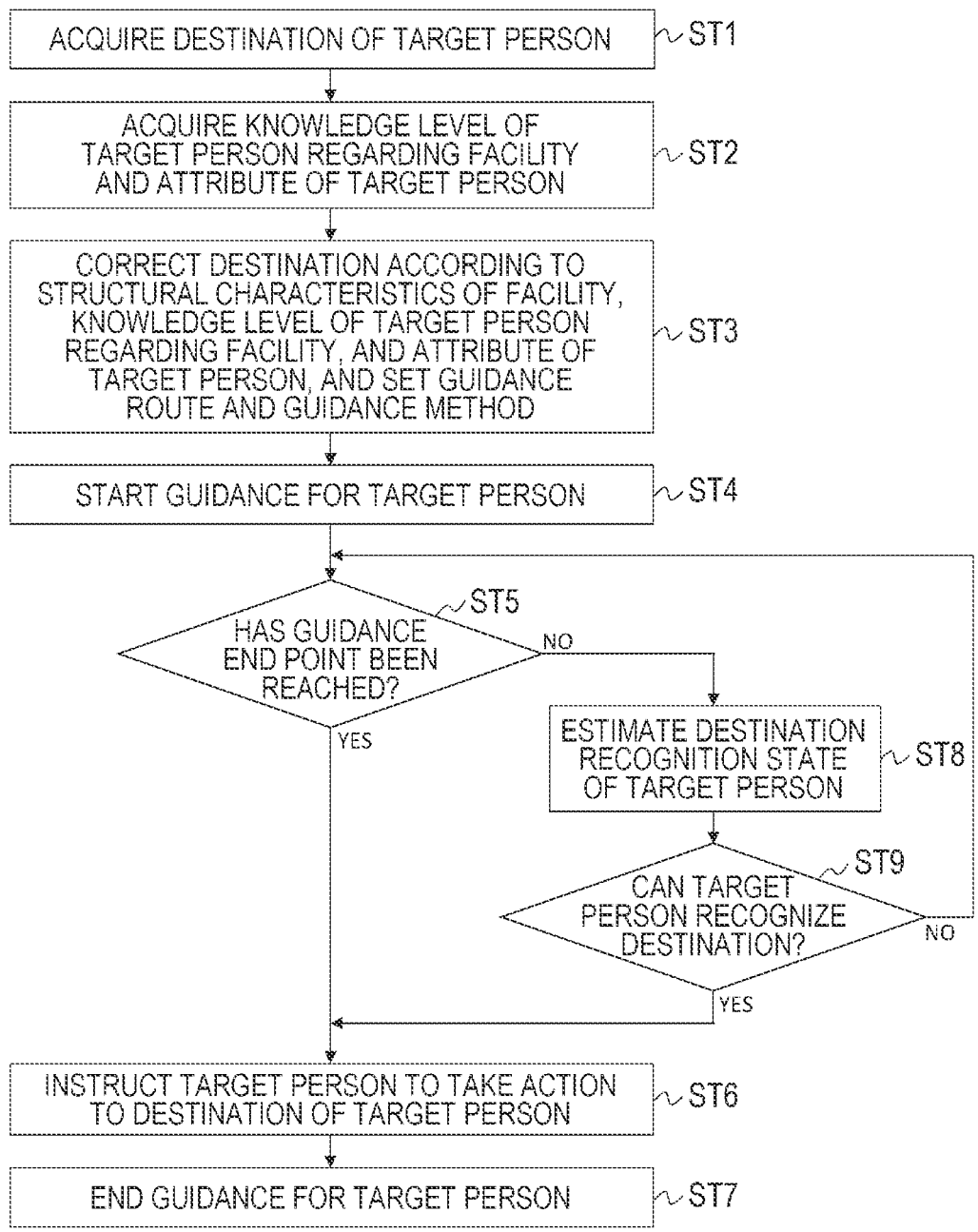
FIG. 11 is a diagram illustrating an example of a guidance processing flow in a processor (information processing device).

FIG. 11 illustrates an example of the guidance processing flow in the processor 111 (information processing device 200). First, in step ST1, the processor 111 acquires the destination of the target person.

Next, in step ST2, the processor 111 acquires the knowledge level of the target person regarding the facility and the attribute of the target person.

Next, in step ST3, the processor 111 corrects the destination according to the structural characteristics of the facility, the knowledge level of the target person regarding the facility, and the attribute of the target person, and sets the guidance route and guidance method (refer to FIGS. 6 and 9).

Next, in step ST4, the processor 111 starts the guidance for the target person. With this start, the guide robot 10 guides the target person on the basis of the guidance route and guidance method set in step ST3.

Next, in step ST5, the processor 111 determines whether or not the guidance end point has been reached. Here, in a case where the destination is not corrected in step ST3, the guidance end point is the destination itself of the target person acquired in step ST1, or in a case where the destination is corrected in step ST3, the guidance end point is the corrected destination.

In a case where it is determined that the guidance end point has been reached, in step ST6, the processor 111 instructs the target person to take an action to the destination of the target person (the destination of the target person acquired in step ST1). Thereafter, in step ST7, the processor 111 ends the guidance for the target person.

Furthermore, in a case where it is determined in step ST5 that the guidance end point has not been reached, the processor 111 estimates the destination recognition state of the target person in step ST8. Then, in step ST9, the processor 111 determines whether or not the target person can recognize the destination.

In this case, in a case where the destination recognition state of the target person is equal to or greater than a threshold value, the processor 111 determines that the target person can recognize the destination of the target person. Furthermore, in this case, in a case where a flow of people different from the target person, heading for the same destination as the destination of the target person is found, the processor 111 determines that the target person can recognize the destination of the target person. Furthermore, in this case, in a case where another guide robot guiding another target person to the same destination as the destination of the target person is found, the processor 111 determines that the target person can recognize the destination of the target person.

In a case where it is determined in step ST9 that the target person cannot recognize the destination, the processor 111 returns to the processing of step ST5. On the other hand, in a case where it is determined in step ST9 that the target person can recognize the destination, the processor 111 instructs the target person to take an action to the destination of the target person in step ST6, and thereafter, ends the guidance for the target person in step ST7.

Figure 12:
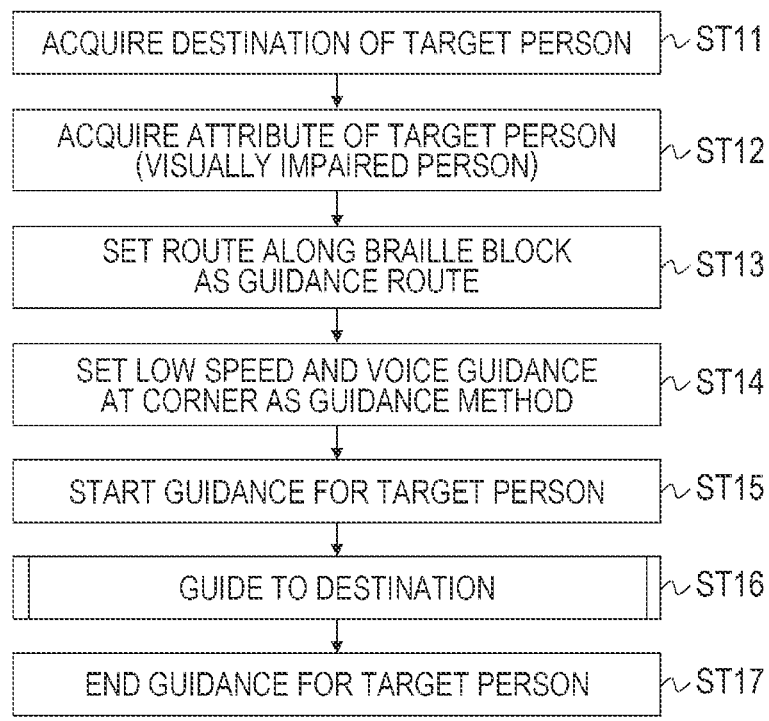
FIG. 12 is a diagram illustrating an example of a guidance processing flow in a case where an attribute of a target person is a visually impaired person in a processor (information processing device).

FIG. 12 illustrates an example of the guidance processing flow in a case where the attribute of the target person is a visually impaired person in the processor 111 (information processing device 200).

First, in step ST11, the processor 111 acquires the destination of the target person. Next, in step ST12, the processor 111 acquires a visually impaired person as the attribute of the target person. Next, in step ST13, the processor 111 sets a route along the braille block as the guidance route.

Next, in step ST14, the processor 111 sets a low speed and voice guidance (temporary stop or turn) at a corner as the guidance method. Then, in step ST15, the processor 111 starts the guidance for the target person.

Next, in step ST16, the processor 111 guides the target person to the destination. In this case, the guidance end is determined under conditions such as the arrival at the destination, the arrival at the destination and the handover to an employee, or the arrival at the destination and the handover to a robot in charge. In a case where the condition of the guidance end is satisfied, the processor 111 ends the guidance for the target person in step ST17.

Figure 13:
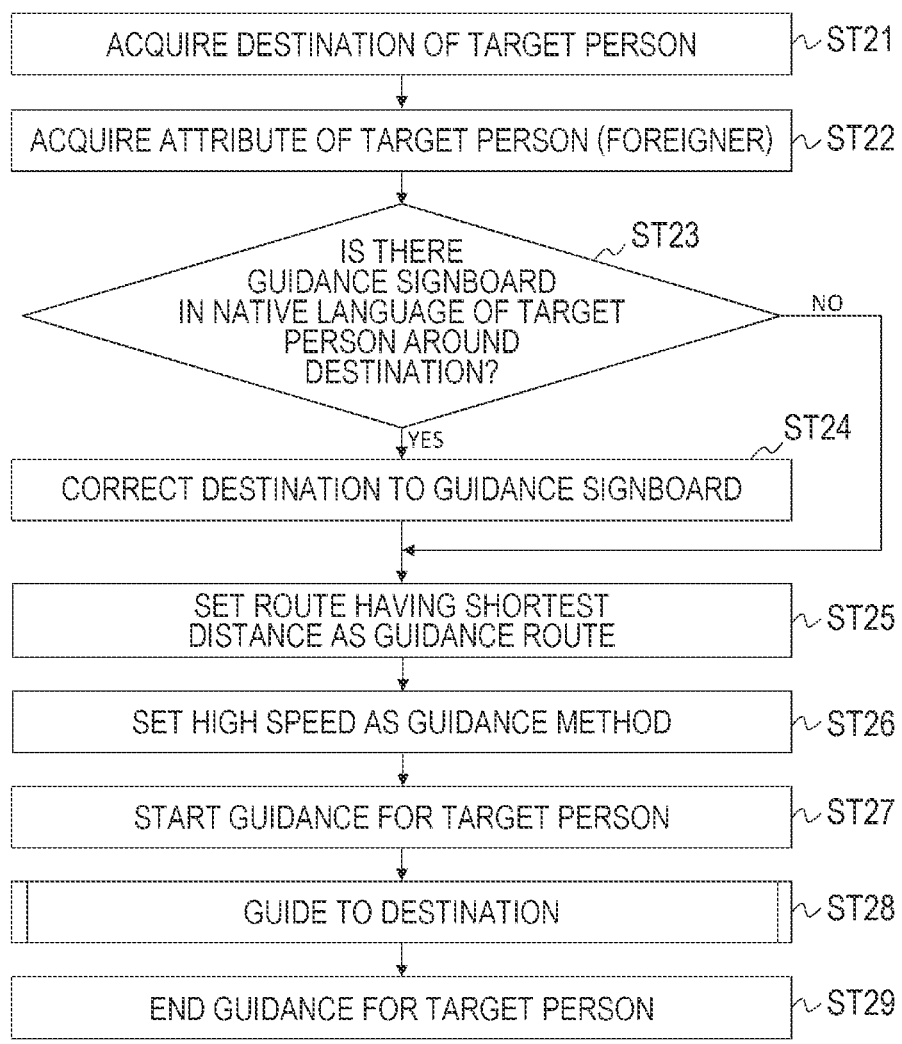
FIG. 13 is a diagram illustrating an example of a guidance processing flow in a case where an attribute of a target person is a foreigner in a processor (information processing device).

FIG. 13 illustrates an example of the guidance processing flow in a case where the attribute of the target person is a foreigner in the processor 111 (information processing device 200).

First, in step ST21, the processor 111 acquires the destination of the target person. Next, in step ST22, the processor 111 acquires a foreigner as the attribute of the target person. Next, in step ST23, the processor 111 determines whether or not there is a guidance signboard in a native language of the target person around the destination.

In a case where it is determined that there is a guidance signboard in a native language of the target person around the destination, the processor 111 corrects the destination to the guidance signboard in step ST24, and then proceeds to the processing of step ST25. On the other hand, in a case where it is determined that there is no guidance signboard in a native language of the target person around the destination, the processor 111 immediately proceeds to the processing of step ST25.

In step ST25, the processor 111 selects a route having the shortest distance as the guidance route. Next, in step ST26, the processor 111 sets a high speed as the guidance method. Then, in step ST27, the processor 111 starts the guidance for the target person.

Next, in step ST28, the processor 111 guides the target person to the destination. In this case, in a case where the destination is not corrected, the guidance end is determined under a condition such as the arrival at the destination. Furthermore, in this case, in a case where the destination is corrected to the guidance signboard, the guidance end is determined under a condition such as the recognition of the guidance signboard of the target person. In a case where the condition of the guidance end is satisfied, the processor 111 ends the guidance for the target person in step ST29.

Note that, in the guidance processing flow of FIG. 13, an example is illustrated in which, in a case where there is a guidance sign in a native language of the target person around the destination, the destination is corrected to the guidance signboard, but the destination may be further corrected according to the knowledge level or the like of the foreigner regarding the facility.

Figure 14:
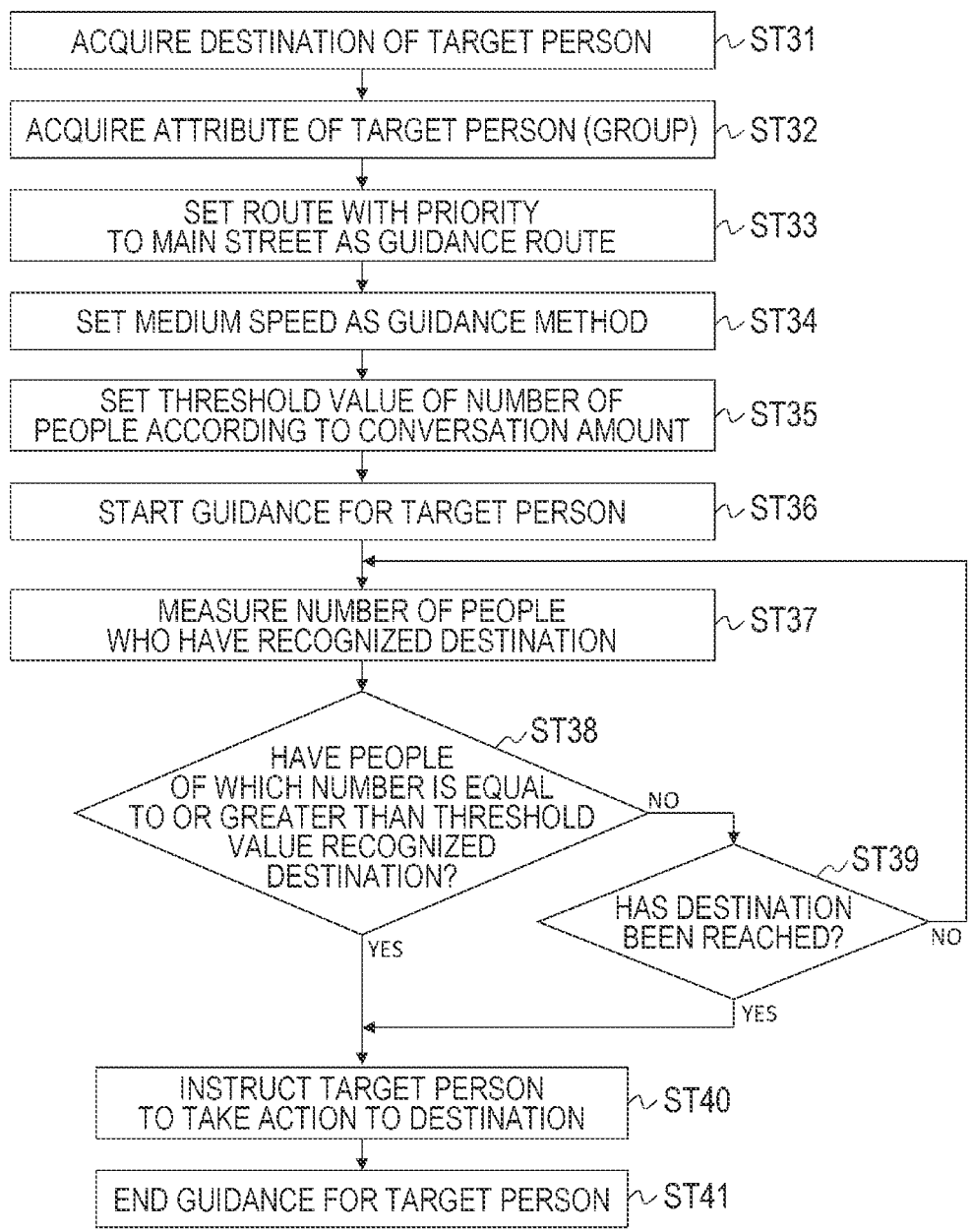
FIG. 14 is a diagram illustrating an example of a guidance processing flow in a case where an attribute of a target person is a group in a processor (information processing device).

FIG. 14 illustrates an example of the guidance processing flow in a case where the attribute of the target person is a group in the processor 111 (information processing device 200).

First, in step ST31, the processor 111 acquires the destination of the target person. Next, in step ST32, the processor 111 acquires a group as the attribute of the target person. Next, in step ST33, the processor 111 sets a route with a priority to a main street as the guidance route. Next, in step ST34, the processor 111 sets a medium speed as the guidance method. Note that, in a case where the number of people in the group is large, a low speed may be set as the guidance method.

Next, the processor 111 sets a threshold value of the number of people according to the conversation amount. For example, in a case where the conversation amount in the group is large, the threshold value of the number of people is set to 1, and in a case where the conversation amount in the group is small, the threshold value of the number of people is set to half. Then, in step ST36, the processor 111 starts the guidance for the target person.

Next, in step ST37, the processor 111 measures the number of people who have recognized the destination. Next, in step ST38, the processor 111 determines whether or not people of which the number is equal to or greater than the threshold value have recognized the destination. In a case where it is determined that people of which the number is equal to or greater than the threshold value have not recognized the destination, the processor 111 determines whether or not the destination is reached in step ST39. In a case where it is determined that the destination is not reached, the processor 111 returns to the processing of step ST37.

In a case where it is determined in step ST38 that people of which the number is equal to or greater than the threshold value have recognized the destination, the processor 111 instructs the target person to take an action to the destination in step ST40, and thereafter, ends the guidance for the target person in step ST41. In this case, a speech instruction such as "The guidance is ended here. Please follow the people who have recognized the destination." is made, for example.

Furthermore, in a case where it is determined in step ST39 that the destination is reached, the processor 111 instructs the target person to take an action to the destination in step ST40, and thereafter, ends the guidance for the target person in step ST41. In this case, a speech instruction such as "The destination has been reached. The guidance is ended." is made, for example.

As described above, in the guide robot 10 illustrated in FIG. 4, the destination is corrected according to the structural characteristics of the facility, the knowledge level of the target person regarding the facility, and the attribute of the target person, and any predetermined point among points from the guidance start point to the destination of the target person is set as the guidance end point. Therefore, the guide robot 10 can guide the guidance target to the destination efficiently as necessary and sufficiently.

Furthermore, in the guide robot 10 illustrated in FIG. 4, after the guidance is started, a point different from the set guidance end point is determined as the guidance end point on the basis of a predetermined condition, and the guidance is ended. Therefore, the guide robot 10 can guide the guidance target to the destination more efficiently as necessary and sufficiently.

Furthermore, in the guide robot 10 illustrated in FIG. 4, the guidance route and the guidance method for guiding the guidance target are set on the basis of the structural characteristics of the facility, the knowledge level of the target person regarding the facility, and the attribute of the target person. Therefore, the guide robot 10 can satisfactorily guide the guidance target to the destination.

2. Modification Example

Note that, in the above-described embodiment, the present technology is applied to the guide robot 10 that guides the target person to the destination (store) in the facility (shopping mall) as the guidance location. Here, in addition to the shopping mall, a station, a public road, an airport, a sightseeing spot, an office, a hotel, and the like can be considered as the guidance location. In this case, it is also conceivable to correct the destination of the target person according to the type of the guidance location.

FIG. 15 illustrates an example of the destination correction depending on the guidance locations. For example, in a case where the guidance location is a station, in a case where the destination of the target person is a train (free seat), the destination is corrected to the staircase to the platform. In this case, the guidance for the target person may be ended at a point where the staircase can be seen.

Furthermore, for example, in a case where the guidance location is a station, in a case where the destination of the target person is a train (reserved seat), the destination is corrected to the staircase to the platform nearest to the passenger car. In this case, the guidance for the target person may be ended at a point where the staircase can be seen. Alternatively, the guidance for the target person may be ended at a point where a person who rides on the same train is found.

Furthermore, for example, in a case where the guidance location is a public road, in a case where the destination is a facility, the destination is corrected to a guidance signboard to the destination. In this case, the guidance for the target person may be ended at a point where the guidance signboard can be seen. Alternatively, the guidance for the target person may be ended at a point where the entrance of the facility can be seen.

Furthermore, for example, in a case where the guidance location is an airport, in a case where the destination is a boarding gate, the destination is corrected to a check-in counter or an entrance of a security checkpoint via the check-in counter. In this case, the guidance for the target person may be ended at a point where the check-in counter can be seen. Alternatively, the guidance for the target person may be ended at a point where a person who rides on the same flight is found.

Furthermore, for example, in a case where the guidance location is a sightseeing spot, in a case where the destination is a famous place, the destination is corrected to a guidance signboard to the famous place. In this case, the guidance for the target person may be ended at a point where the guidance signboard can be seen. Alternatively, the guidance for the target person may be ended at a point where the flow of people heading for the same destination is found.

Furthermore, for example, in a case where the guidance location is an office, in a case where the destination is a conference room, the destination is corrected to the closest conference room arranged in series to the destination. Furthermore, for example, in a case where the guidance location is a hotel, in a case where the destination is a guest room, the destination is corrected to an elevator or the closest guest room arranged in series to the destination.

Figure 16:
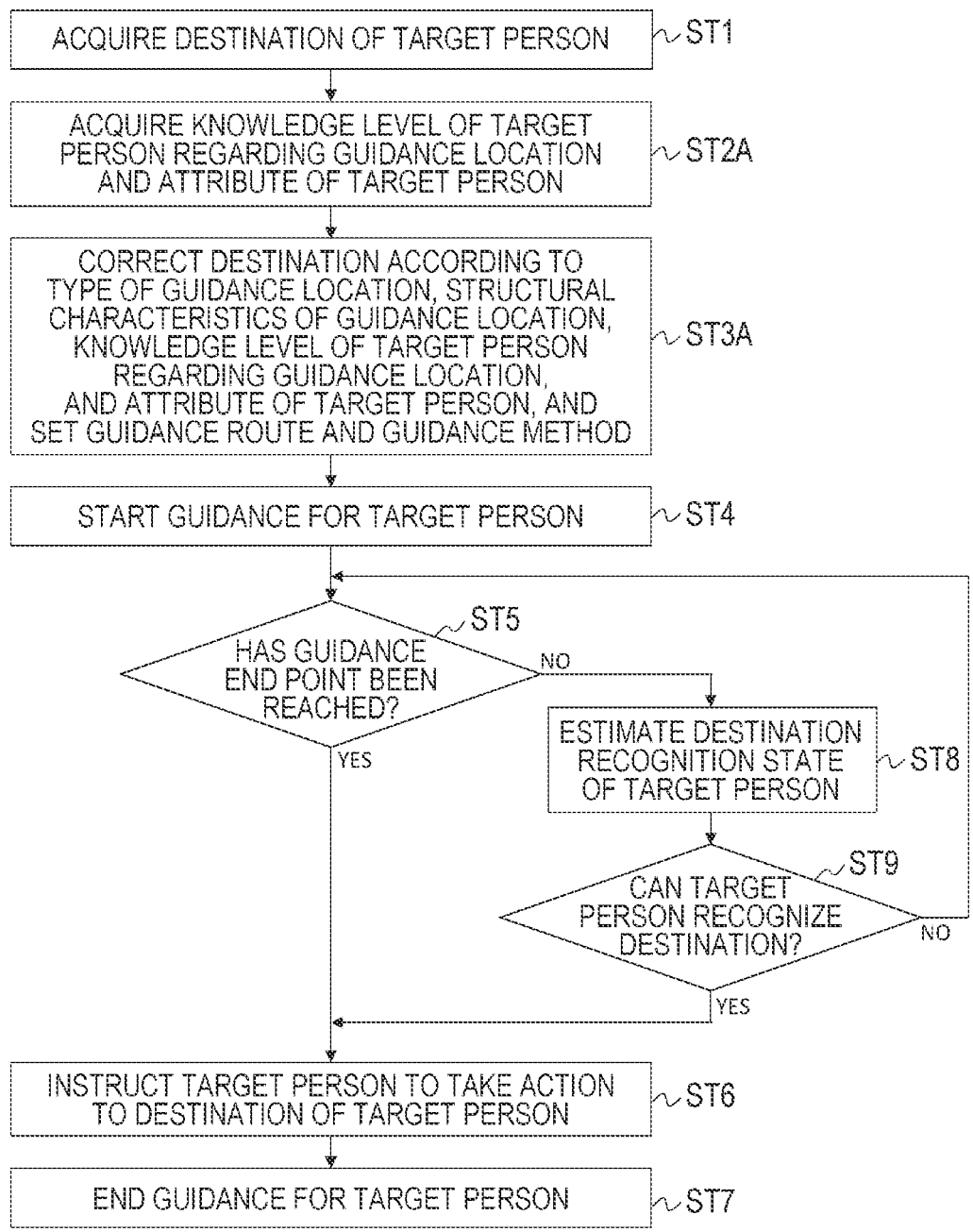
FIG. 16 is a diagram illustrating an example of a guidance processing flow in a processor (information processing device) of a guide robot coping with a plurality of guidance locations.

FIG. 16 illustrates an example of the guidance processing flow in the processor 111 (information processing device 200) of the guide robot 10 (refer to FIG. 4) coping with a plurality of guidance locations. In FIG. 16, steps corresponding to those in FIG. 11 are denoted by the same reference numerals, and detailed description thereof is appropriately omitted.

First, in step ST1, the processor 111 acquires the destination of the target person.

Next, in step ST2A, the processor 111 acquires the knowledge level of the target person regarding the guidance location and the attribute of the target person.

Next, in step ST3A, the processor 111 corrects the destination according to the type of the guidance location, the structural characteristics of the guidance location, the knowledge level of the target person regarding the guidance location, and the attribute of the target person, and sets the guidance route and guidance method (refer to FIGS. 6, 9, and 15).

Since the subsequent steps are similar to those in the guidance processing flow of FIG. 11, the description thereof will be omitted.

Furthermore, in the above-described embodiment, an example has been described in which one guide robot 10 guides the target person to the guidance end point. However, it is also conceivable that a plurality of guide robots 10 take over and guide the target person to the guidance end point.

For example, in a case where the target person is at a station and the destination is a predetermined store of a shopping mall, it is assumed that a first guide robot 10 guides the target person from the station to the entrance of the shopping mall, and a second guide robot 10 guides the target person from the entrance of the shopping mall to the predetermined store. In this case, in a case where the guidance is handed over to the second guide robot 10, the first guide robot 10 also hands over the information such as the destination, the guidance route, and guidance method.

In a case where the plurality of guide robots 10 takes over and guide the target person to the guidance end point in this manner, it is conceivable to improve the operating rate in a manner that, for example, in a case where the knowledge level of the target person regarding the guidance location is low, the guide robot 10, which takes over the guidance, guides the target person until the target person meets a robot of the other party, and on the other hand, in a case where the knowledge level of the target person regarding the guidance location is high, the guide robot 10 ends the guidance at a point where the robot of the other party can be seen.

Furthermore, in the above-described embodiment, an example has been described in which the present technology is applied to the guide robot 10 as the mobile device. However, the present technology can also be applied to a car navigation system. That is, by correcting the destination according to the structural characteristics of a traveling location, the attribute of a driver, and the knowledge level of the driver regarding the traveling location, and setting the guidance route and guidance method, the guidance to the destination for the vehicle and the driver can be performed efficiently as necessary and sufficiently.

Figure 17:
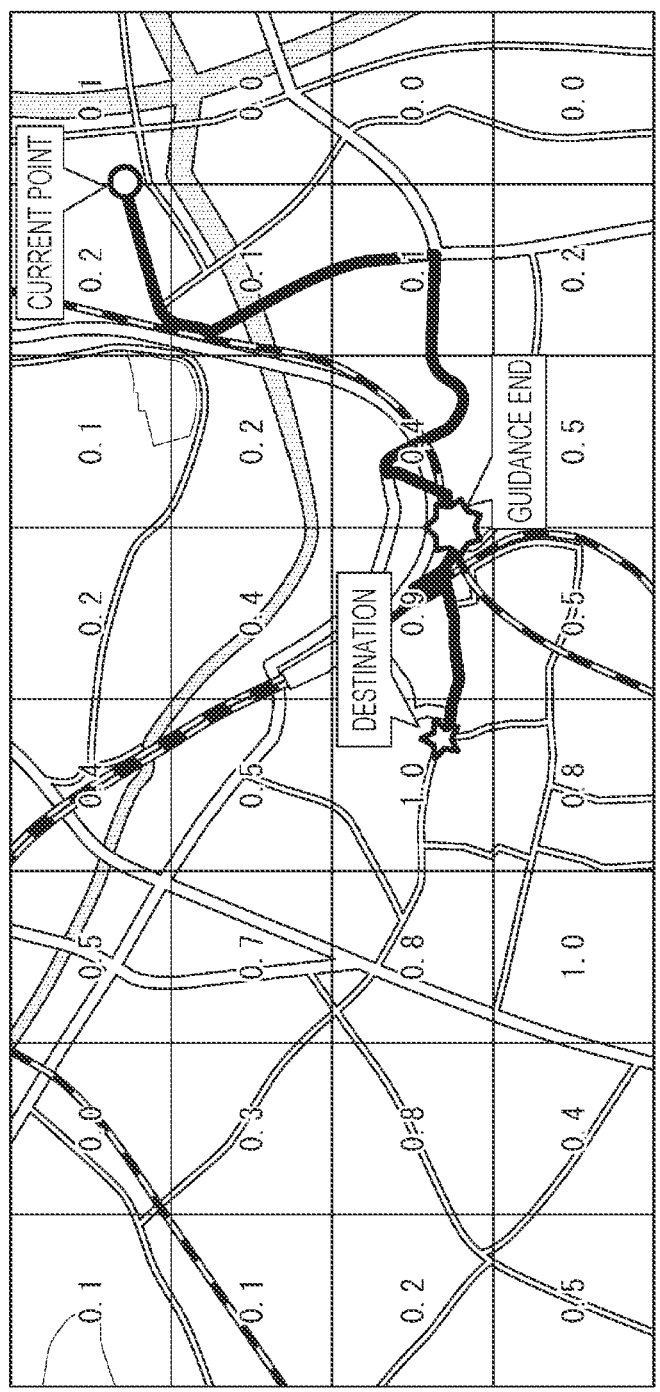
FIG. 17 is a diagram for describing an example of application of the present technology to a car navigation system.

For example, as illustrated in FIG. 17, it is configured such that the knowledge of the driver is digitized and recorded from the travel frequency for each area, and the guidance is ended in a case where the knowledge of the area on the travel route from the current location to the destination is equal to or greater than a threshold value. In this case, a point at which the driver enters an area well known to the driver is set to a corrected destination, and the guidance is ended at this point. In this case, the driver can reliably arrive at the destination, and the car navigation system can also efficiently perform the guidance.

Furthermore, for example, it is also conceivable to end the guidance on the basis of not only the knowledge of the driver but also the structure of the travel route. For example, even in a case where the knowledge of the driver is low, in a case where the vehicle arrives at the destination by traveling along one road to the destination, a point slightly away from the destination is set to a corrected destination, and the guidance is ended at this point. In this case, the driver can reliably arrive at the destination, and the car navigation system can also efficiently perform the guidance.

Furthermore, the preferred embodiments of the present disclosure have been described in detail with reference to the accompanying drawings, but the technical scope of the present disclosure is not limited to such examples. It is obvious that a person having ordinary skills in the technical field of the present disclosure can conceive of various modifications or alterations within the scope of the technical idea described in claims, and it is understood that the modifications or the alterations naturally belong to the technical scope of the present disclosure.

Furthermore, the effects described in the present specification are merely illustrative or exemplary, and are not limited. That is, the technology according to the present disclosure can exhibit other effects that are apparent to those skilled in the art from the description of the present specification, in addition to the affects described above or instead of the effects described above.

Furthermore, the present technology can have the following configurations.

(1) An information processing device included in a mobile device that guides a guidance target to a destination, the information processing device including:
  a setting unit that sets any predetermined point among points from a guidance start point to the destination of the guidance target as a guidance end point on the basis of the destination of the guidance target and at least one or more of environment information of a guidance route, an attribute of the guidance target, and unique information of the guidance target.

(2) The information processing device described in (1),
  in which the destination of the guidance target includes a predetermined facility or a predetermined point in the predetermined facility.

(3) The information processing device described in (1) or (2),
  in which in a case where the destination of the guidance target is a predetermined point in a predetermined facility, the environment information of the guidance route includes a type of the predetermined facility or a structural characteristic of the predetermined facility.

(4) The information processing device described in any one of (1) to (3),
  in which in a case where the destination of the guidance target is a predetermined point in a predetermined facility, the unique information of the guidance target is information for acquiring a knowledge level regarding the predetermined facility.

(5) The information processing device described in (4),
  in which the information for acquiring the knowledge level regarding the predetermined facility includes information of a history of visiting the predetermined point in the predetermined facility or the predetermined facility in a past.

(6) The information processing device described in any one of (1) to (5), further including:
  an attribute estimation unit that estimates an attribute of the guidance target on the basis of sensor information.

(7) The information processing device described in any one of (1) to (6),
  in which the mobile device includes a guide robot.

(8) The information processing device described in any one of (1) to (7), further including:
  a determination unit that determines a point different from the set guidance end point as a guidance end point on the basis of a predetermined condition after guidance is started.

(9) The information processing device described in (8),
  in which the predetermined condition includes being estimated that the guidance target has recognized the destination of the guidance target.

(10) The information processing device described in (8) or (9),
  in which the predetermined condition includes that a flow of another target different from the guidance target, heading for a same destination as the destination of the guidance target, is found.

(11) The information processing device described in (10),
  in which the finding of the other target is performed on the basis of a moving direction of the other target and statistical information regarding the destination of the guidance target.

(12) The information processing device described in (10),
  in which the finding of the other target is performed on the basis of destination information acquired from a terminal held by the other target.

(13) The information processing device described in any one of (8) to (12),
  in which the predetermined condition includes that another mobile device that guides another guidance target to a same destination as the destination of the guidance target is found.

(14) The information processing device described in any one of (1) to (13),
  in which the setting unit further sets a guidance route and a guidance method which are for guiding the guidance target, on the basis of the destination of the guidance target, and at least one or more of the environment information of the guidance route, the attribute of the guidance target, and the unique information of the guidance target.

(15) The information processing device described in any one of (1) to (14),
  in which the mobile device guides the guidance target to the set guidance end point.

(16) The information processing device described in any one of (1) to (14),
  in which the mobile device guides the guidance target to any predetermined point among points from the guidance start point to the set guidance end point, at which the mobile device hands over the guidance to another mobile device that guides the guidance target to the set guidance end point.

(17) The information processing device described in any one of (1) to (16),
  in which the guidance target is a plurality of guidance targets having a same destination.

(18) An information processing method including:
  a procedure of setting any predetermined point among points from a guidance start point to a destination of a guidance target as a guidance end point on the basis of the destination of the guidance target and at least one or more of environment information of a guidance route, an attribute of the guidance target, and unique information of the guidance target.

(19) A program causing a computer to function as:
  a setting unit that sets any predetermined point among points from a guidance start point to a destination of a guidance target as a guidance end point on the basis of the destination of the guidance target and at least one or more of environment information of a guidance route, an attribute of the guidance target, and unique information of the guidance target.

(20) A mobile device that includes an information processing device, and guides a guidance target to a destination, in which the information processing device includes a setting unit that sets any predetermined point among points from a guidance start point to the destination of the guidance target as a guidance end point on the basis of the destination of the guidance target and at least one or more of environment information of a guidance route, an attribute of the guidance target, and unique information of the guidance target.

REFERENCE SIGNS LIST

10 Guide robot
110 Processing unit
111 Processor
112 Memory
113 Storage
120 Input unit
121 LiDAR
122 Camera
123 Microphone
124 Touch panel
125 Keyboard
130 Output unit
131 Display
132 Speaker
140 Output unit
141 Wheel
142 Arm
150 Communication unit
200 Information processing device
201 Destination acquisition unit
202 Target person attribute acquisition unit
203 Facility knowledge level acquisition unit
204 Destination correction unit
205 Route search unit
206 Guidance generation unit
207 People flow estimation unit
208 Guidance end determination unit

The invention claimed is:

1. An information processing device, comprising:
a processor configured to:
  acquire, from at least one sensor, sensor data corresponding to a first guidance target, wherein
    the sensor data includes at least one of image data or speech data of the first guidance target, and
    the information processing device and the at least one sensor are in a first mobile device that guides the first guidance target to a destination;
  execute at least one of an image recognition process on the image data or a voice recognition process on the speech data;
  estimate an attribute of the first guidance target based on the executed at least one of the image recognition process or the voice recognition process;
  set a guidance route from a guidance start point to a guidance end point based on the destination of the first guidance target, the estimated attribute of the first guidance target, and at least one of environment information of the guidance route or unique information of the first guidance target, wherein the guidance end point is the destination of the first guidance target;
  determine, based on a specific condition, a first point different from the guidance end point as a specific guidance end point after guidance is started, wherein the specific condition includes one of:
    a determination of a flow of a second guidance target different from the first guidance target towards the destination of the first guidance target, or
    a determination of a second mobile device that guides the second guidance target to the destination of the first guidance target; and
  control, based on the set guidance route and the specific guidance end point, the first mobile device to guide the first guidance target.

2. The information processing device according to claim 1, wherein
the destination of the first guidance target includes one of a specific facility or a second point in the specific facility.

3. The information processing device according to claim 1, wherein
in a case where the destination of the first guidance target is a second point in a specific facility, the environment information of the guidance route includes one of a type of the specific facility or a structural characteristic of the specific facility.

4. The information processing device according to claim 1, wherein
in a case where the destination of the first guidance target is a second point in a specific facility, the unique information of the first guidance target includes information to acquire a knowledge level associated with the specific facility.

5. The information processing device according to claim 4, wherein
the information to acquire the knowledge level associated with the specific facility includes a visiting history of the first guidance target at one of the second point in the specific facility or the specific facility in past.

6. The information processing device according to claim 1, wherein the first mobile device includes a guide robot.

7. The information processing device according to claim 1, wherein the specific condition includes an estimation that the first guidance target has recognized the destination of the first guidance target.

8. The information processing device according to claim 1, wherein
the determination of the flow of the second guidance target is executed based on a moving direction of the second guidance target and statistical information associated with the destination of the first guidance target.

9. The information processing device according to claim 1, wherein
the determination of the flow of the second guidance target is executed based on destination information acquired from a terminal held by the second guidance target.

10. The information processing device according to claim 1, wherein
the processor is further configured to set a guidance method to guide the first guidance target, and
the guidance method is set based on the destination of the first guidance target, and at least one of the environment information of the guidance route, the attribute of the first guidance target, and the unique information of the first guidance target.

11. The information processing device according to claim 1, wherein the processor is further configured to control the first mobile device to receive control to guide the first guidance target to the guidance end point.

12. The information processing device according to claim 1, wherein the processor is further configured to:
control the first mobile device to guide the first guidance target to a third point among a plurality of points from the guidance start point to the guidance end point; and
control the first mobile device to hand over the guidance to a third mobile device that guides the first guidance target to the guidance end point.

13. The information processing device according to claim 1, wherein
the first guidance target includes a plurality of guidance targets having a same destination.

14. An information processing method, comprising:
acquiring, from at least one sensor, sensor data corresponding to a first guidance target, wherein
the sensor data includes at least one of image data or speech data of the first guidance target, and
the information processing device and the at least one sensor are in a first mobile device that guides the first guidance target to a destination;
executing at least one of an image recognition process on the image data or a voice recognition process on the speech data;
estimating an attribute of the first guidance target based on the executed at least one of the image recognition process or the voice recognition process;
setting a guidance route from a guidance start point to a guidance end point based on the destination of the first guidance target, the estimated attribute of the first guidance target, and at least one of environment information of the guidance route or unique information of the first guidance target, wherein the guidance end point is the destination of the first guidance target;
determining, based on a specific condition, a specific point different from the guidance end point as a specific guidance end point after guidance is started, wherein the specific condition includes one of:
a determination of a flow of a second guidance target different from the first guidance target towards the destination of the first guidance target, or
a determination of a second mobile device that guides the second guidance target to the destination of the first guidance target; and
controlling, based on the set guidance route and the specific guidance end point, the first mobile device to guide the first guidance target.

15. A non-transitory computer-readable medium having stored thereon, computer-executable instructions which, when executed by a computer, cause the computer to execute operations, the operations comprising:
acquiring, from at least one sensor, sensor data corresponding to a first guidance target, wherein
the sensor data includes at least one of image data or speech data of the first guidance target, and
an information processing device and the at least one sensor are in a first mobile device that guides the first guidance target to a destination;
executing at least one of an image recognition process on the image data or a voice recognition process on the speech data;
estimating an attribute of the first guidance target based on the executed at least one of the image recognition process or the voice recognition process;
setting a guidance route from a guidance start point to a guidance end point based on the destination of the first guidance target, the estimated attribute of the first guidance target, and at least one of environment information of the guidance route or unique information of the first guidance target, wherein the guidance end point is the destination of the first guidance target;
determining, based on a specific condition, a specific point different from the guidance end point as a specific guidance end point after guidance is started, wherein the specific condition includes one of:
a determination of a flow of a second guidance target different from the first guidance target towards the destination of the first guidance target, or
a determination of a second mobile device that guides the second guidance target to the destination of the first guidance target; and
controlling, based on the set guidance route and the specific guidance end point, the first mobile device to guide the first guidance target.

16. A first mobile device that includes an information processing device, wherein the information processing device comprising:
a processor configured to:
acquire, from at least one sensor, sensor data corresponding to a first guidance target, wherein
the sensor data includes at least one of image data or speech data of the first guidance target, and
the at least one sensor is in the first mobile device that guides the first guidance target to a destination;
execute at least one of an image recognition process on the image data or a voice recognition process on the speech data;
estimate an attribute of the first guidance target based on the executed at least one of the image recognition process or the voice recognition process;
set a guidance route from a guidance start point to a guidance end point based on the destination of the first guidance target, the estimated attribute of the first guidance target, and at least one of environment information of the first guidance target, wherein the guidance end point is the destination of the first guidance target;
determine, based on a specific condition, a specific point different from the guidance end point as a specific guidance end point after guidance is started, wherein the specific condition includes one of:
a determination of a flow of a second guidance target different from the first guidance target towards the destination of the first guidance target, or
a determination of a second mobile device that guides the second guidance target to the destination of the first guidance target; and
output, based on the set guidance route and the specific guidance end point, information to guide the first guidance target.

* * * * *